(12) United States Patent
Fattal et al.

(10) Patent No.: US 12,204,137 B2
(45) Date of Patent: *Jan. 21, 2025

(54) MULTIVIEW BACKLIGHT, DISPLAY, AND METHOD WITH REFLECTIVE SUB-ELEMENTS HAVING VARYING PROTRUSION DISTANCES

(71) Applicant: LEIA INC., Menlo Park, CA (US)

(72) Inventors: David A. Fattal, Mountain View, CA (US); Thomas Hoekman, Redwood City, CA (US); Colton Bukowsky, Redwood City, CA (US); Ming Ma, Menlo Park, CA (US)

(73) Assignee: LEIA INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/494,690

(22) Filed: Oct. 25, 2023

(65) Prior Publication Data
US 2024/0069268 A1 Feb. 29, 2024

Related U.S. Application Data

(63) Continuation of application No. PCT/US2021/039448, filed on Jun. 28, 2021.

(51) Int. Cl.
*F21V 8/00* (2006.01)
*G02B 5/18* (2006.01)
(Continued)

(52) U.S. Cl.
CPC ......... *G02B 6/0036* (2013.01); *G02B 5/1819* (2013.01); *G02B 6/0055* (2013.01);
(Continued)

(58) Field of Classification Search
CPC .. G02B 5/1819; G02B 6/0036; G02B 6/0055; G02B 30/33; G02B 30/35; G02F 1/133605; G02F 1/133606; G02F 1/133607
See application file for complete search history.

(56) References Cited

U.S. PATENT DOCUMENTS 7,040,796 B2 5/2006 Sugiura et al.
7,876,397 B2 1/2011 Krijn et al.
(Continued)

FOREIGN PATENT DOCUMENTS

CA 3220592 1/2023
CN 117581059 2/2024
(Continued)

OTHER PUBLICATIONS

Fattal, David et al., "A multi-directional backlight for a wide-angle, glasses-free three-dimensional display," Nature, Mar. 21, 2013, pp. 348-351, vol. 495, Macmillan Publishers Limited, 2013.
(Continued)

*Primary Examiner* — Keith G. Delahoussaye
(74) *Attorney, Agent, or Firm* — Schwegman Lundberg & Woessner, P.A.

(57) ABSTRACT

A multiview backlight, multiview display, and method of multiview backlight operation include reflective multibeam elements configured to provide emitted light having directional light beams with directions corresponding to view directions of a multiview image. The multiview backlight includes a light guide configured to guide light and an array of the reflective multibeam elements. Each reflective multibeam element includes a plurality of reflective sub-elements and is configured to reflectively scatter out a portion of the guided light as the emitted light. The multiview display includes the multiview backlight and an array of light valves to modulate the directional light beams to
(Continued)

provide the multiview image. Each reflective sub-element protrudes from a guiding surface of the light guide by a respective protrusion distance. At least some of the protrusion distances can vary as a function of distance along a length of the light guide.

17 Claims, 7 Drawing Sheets

(51) Int. Cl.
  *G02B 30/33* (2020.01)
  *G02B 30/35* (2020.01)
  *G02F 1/1335* (2006.01)
  *G02F 1/13357* (2006.01)

(52) U.S. Cl.
  CPC ........ *G02F 1/133605* (2013.01); *G02B 30/33* (2020.01); *G02B 30/35* (2020.01); *G02F 1/133606* (2013.01); *G02F 1/133607* (2021.01); *G02F 2201/305* (2013.01)

(56) References Cited

U.S. PATENT DOCUMENTS

| | | | |
|---|---|---|---|
| 9,128,226 | B2 | 9/2015 | Fattal et al. |
| 9,201,270 | B2 | 12/2015 | Fattal et al. |
| 9,298,168 | B2 | 3/2016 | Taff et al. |
| 9,389,415 | B2 | 7/2016 | Fattal et al. |
| 9,459,461 | B2 | 10/2016 | Santori et al. |
| 9,557,466 | B2 | 1/2017 | Fattal |
| 9,785,119 | B2 | 10/2017 | Taff et al. |
| 10,345,505 | B2 | 7/2019 | Fattal |
| 10,649,128 | B2 | 5/2020 | Fattal et al. |
| 10,678,094 | B2 | 6/2020 | Fattal et al. |
| 10,712,501 | B2 | 7/2020 | Fattal |
| 10,798,371 | B2 | 10/2020 | Fattal |
| 10,830,939 | B2 | 11/2020 | Fattal et al. |
| 10,884,175 | B2 | 1/2021 | Fattal |
| 10,928,677 | B2 | 2/2021 | Aieta et al. |
| 10,948,647 | B2 | 3/2021 | Fattal |
| 10,969,531 | B2 | 4/2021 | Fattal et al. |
| 11,016,235 | B2 | 5/2021 | Fattal et al. |
| 11,048,037 | B2 | 6/2021 | Fattal et al. |
| 11,143,810 | B2 | 10/2021 | Fattal et al. |
| 11,204,457 | B2 | 12/2021 | Fattal et al. |
| 11,256,022 | B2 | 2/2022 | Aieta et al. |
| 11,327,337 | B2 | 5/2022 | Fattal |
| 11,347,053 | B2 | 5/2022 | Fattal |
| 11,909,948 | B2* | 2/2024 | Fattal .................. G02B 6/0036 |
| 2009/0322986 | A1 | 12/2009 | Wei et al. |
| 2011/0141395 | A1* | 6/2011 | Yashiro ................ G02B 6/0038 362/606 |
| 2012/0200807 | A1 | 8/2012 | Wei et al. |
| 2012/0275190 | A1 | 11/2012 | Matsumoto et al. |
| 2013/0169518 | A1 | 7/2013 | Wu et al. |
| 2017/0299793 | A1 | 10/2017 | Fattal |
| 2017/0363794 | A1 | 12/2017 | Wan et al. |
| 2018/0129060 | A1 | 5/2018 | Lee et al. |
| 2018/0299608 | A1 | 10/2018 | Fattal et al. |
| 2019/0155105 | A1* | 5/2019 | Aieta .................. G02B 6/0036 |
| 2019/0227335 | A1* | 7/2019 | Fattal .................. G02B 5/1819 |
| 2020/0018886 | A1 | 1/2020 | Fattal et al. |
| 2020/0064552 | A1* | 2/2020 | Fattal .................... G02B 30/33 |
| 2021/0240005 | A1 | 8/2021 | Fattal et al. |
| 2022/0113554 | A1 | 4/2022 | Fattal et al. |
| 2022/0171118 | A1 | 6/2022 | Fattal et al. |
| 2022/0191462 | A1 | 6/2022 | Fattal et al. |
| 2022/0244447 | A1 | 8/2022 | Fattal et al. |
| 2022/0350071 | A1 | 11/2022 | Fattal et al. |
| 2022/0350072 | A1 | 11/2022 | Fattal et al. |
| 2022/0357500 | A1 | 11/2022 | Fattal et al. |

FOREIGN PATENT DOCUMENTS

| | | |
|---|---|---|
| EP | 4363769 | 5/2024 |
| JP | 2024527718 | 7/2024 |
| KR | 20040014890 A | 2/2004 |
| KR | 20230172558 | 12/2023 |
| TW | 202310612 | 3/2023 |
| TW | I813340 | 8/2023 |
| WO | 2012038856 A1 | 3/2012 |
| WO | 2023277866 | 1/2023 |

OTHER PUBLICATIONS

Kee, Edwin., "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.
Reichelt et al., "Holographic 3-D Displays—Electro-holography within the Grasp of Commercialization," Advances in Lasers and Electro-Optics, Optics, Nelson Costa and Adolfo Cartaxo (Ed.), (2010), pp. 683-711, ISBN: 978-953-307-088-9, InTech, Available from: http://www.intechopen.com/books/advances-in-lasers-and-electro-optics/holographic-3-ddisplays-electro-holography-within-the-grasp-of-commercialization.
Travis et al., "Collimated light from a waveguide for a display backlight," Optics Express, Oct. 2009, pp. 19714-19719, vol. 17, No. 22.
Xu et al., "Computer-Generated Holography for Dynamic Display of 3D Objects with Full Parallax," International Journal of Virtual Reality, 2009, pp. 33-38, vol. 8, No. 2.
Son, Jung-Young et al., "Three-Dimensional Imaging Methods Based on Multiview Images," IEEE/OSA Journal of Display Technology, Sep. 2005, pp. 125-140, vol. 1, No. 1.
"Taiwanese Application Serial No. 111122285, Office Action mailed Mar. 21, 2023", w English Translation, 18 pgs.
"Taiwanese Application Serial No. 111122285, Response filed May 29, 2023 to Office Action mailed Mar. 21, 2023", w English Translation, 47 pgs.
"International Application Serial No. PCT US2021 039448, International Preliminary Report on Patentability mailed Jan. 11, 2024", 7 pgs.
International Search Report and Written Opinion (ISRWO) from the International Searching Authority (ISA/KR) dated Mar. 24, 2022 (12 pages) for counterpart parent PCT Application No. PCT/US2021/039448.
"Japanese Application Serial No. 2023-580601, Voluntary Amendment Filed Feb. 27, 2024", w English Claims, 14 pgs.
"European Application Serial No. 21948621.4, Response to Communication pursuant to Rules 161(1) and 162 EPC filed Jul. 8, 2024", 11 pgs.

* cited by examiner

MULTIVIEW BACKLIGHT, DISPLAY, AND METHOD WITH REFLECTIVE SUB-ELEMENTS HAVING VARYING PROTRUSION DISTANCES

CROSS-REFERENCE TO RELATED APPLICATION

This application is a continuation patent application of and claims priority to International Patent Application No. PCT/US2021/039448, filed Jun. 28, 2021, the entire contents of which are herein incorporated by reference.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Most commonly employed electronic displays include the cathode ray tube (CRT), plasma display panels (PDP), liquid crystal displays (LCD), electroluminescent displays (EL), organic light emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). Generally, electronic displays may be categorized as either active displays (i.e., displays that emit light) or passive displays (i.e., displays that modulate light provided by another source). Examples of active displays include CRTs, PDPs and OLEDs/AMOLEDs. Example of passive displays include LCDs and EP displays. Passive displays, while often exhibiting attractive performance characteristics including, but not limited to, inherently low power consumption, may find somewhat limited use in many practical applications given the lack of an ability to emit light.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements.

Certain examples and embodiments have other features that are one of in addition to and in lieu of the features illustrated in the above-referenced figures. These and other features are detailed below with reference to the above-referenced figures.

DETAILED DESCRIPTION

Examples and embodiments in accordance with the principles described herein provide multiview backlighting having applications to a multiview or three-dimensional (3D) display. In particular, embodiments consistent with the principles described herein provide a multiview backlight that employ an array of reflective multibeam elements configured to provide emitted light. The emitted light comprises directional light beams having directions corresponding to respective view directions of a multiview display. According to various embodiments, reflective multibeam elements of the reflective multibeam element array comprise a plurality of reflective sub-elements configured to reflectively scatter light out from a light guide as the emitted light. The presence of the plurality of reflective sub-elements within the reflective multibeam elements may facilitate granular control of reflective scattering properties of the emitted light. For example, the reflective sub-elements may provide granular control of scattering direction, magnitude, and Moiré mitigation associated with the various reflective multibeam elements. Uses of multiview displays that employ the multiview backlight described herein include, but are not limited to, mobile telephones (e.g., smart phones), watches, tablet computes, mobile computers (e.g., laptop computers), personal computers and computer monitors, automobile display consoles, cameras displays, and various other mobile as well as substantially non-mobile display applications and devices.

Herein a 'two-dimensional display' or '2D display' is defined as a display configured to provide a view of an image that is substantially the same regardless of a direction from which the image is viewed (i.e., within a predefined viewing angle or range of the 2D display). A conventional liquid crystal display (LCD) found in many smart phones and computer monitors are examples of 2D displays. In contrast herein, a 'multiview display' is defined as an electronic display or display system configured to provide different views of a multiview image in or from different view directions. In particular, the different views may represent different perspective views of a scene or object of the multiview image, according to some embodiments.

Figure 1:
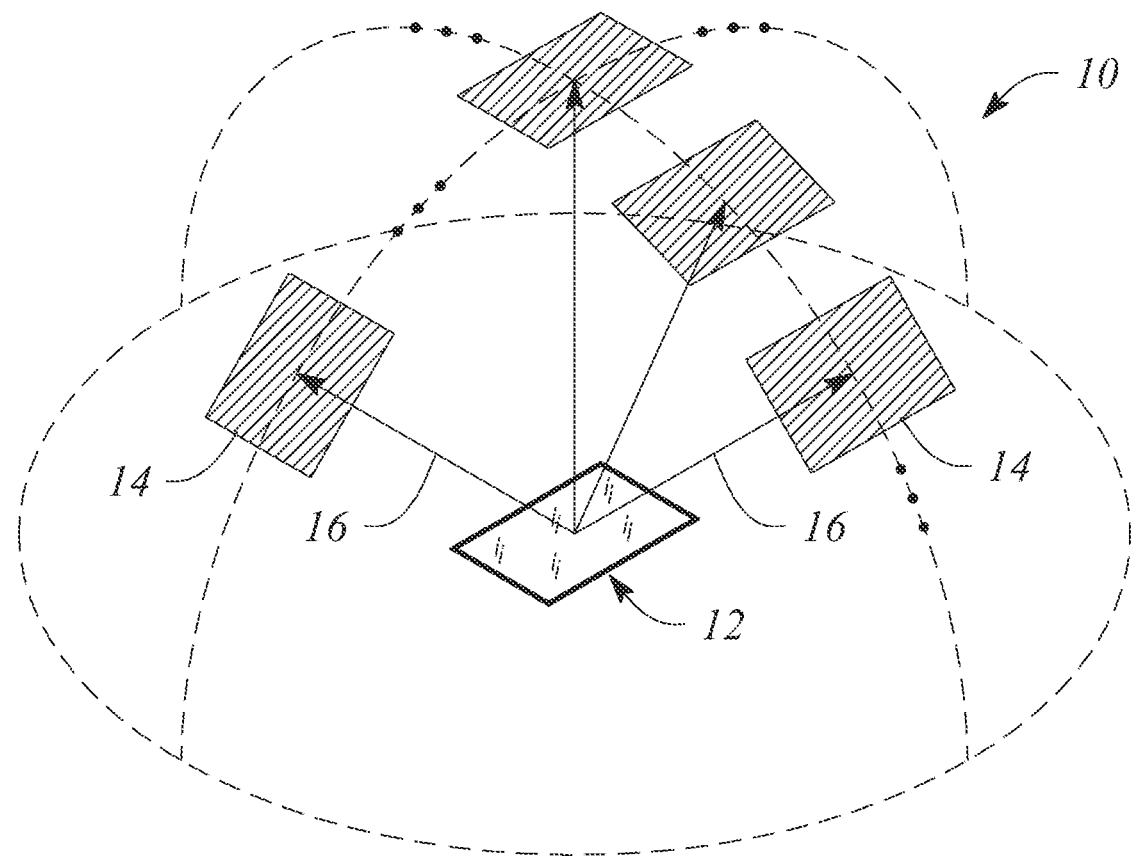
FIG. 1 illustrates a perspective view of a multiview display in an example according to an embodiment consistent with the principles described herein.

FIG. 1 illustrates a perspective view of a multiview display 10 in an example, according to an embodiment consistent with the principles described herein. As illustrated in FIG. 1, the multiview display 10 comprises a screen 12 to display a multiview image to be viewed. The screen 12 may be a display screen of a telephone (e.g., mobile telephone, smart phone, etc.), a tablet computer, a laptop computer, a computer monitor of a desktop computer, a camera display, or an electronic display of substantially any other device, for example. The multiview display 10 provides different views 14 of the multiview image in different view directions 16 relative to the screen 12. The view directions 16 are illustrated as arrows extending from the screen 12 in various different principal angular directions; the different views 14 are illustrated as shaded polygonal boxes at the termination of the arrows (i.e., depicting the view directions 16); and only four views 14 and four view directions 16 are illustrated, all by way of example and not limitation. Note that while the different views 14 are illustrated in FIG. 1 as being above the screen, the views 14 actually appear on or in a vicinity of the screen 12 when the multiview image is displayed on the multiview display 10. Depicting the views 14 above the screen 12 is only for simplicity of illustration and is meant to represent viewing the multiview display 10 from a respective one of the view directions 16 corresponding to a particular view 14. A 2D display may be substantially similar to the multiview display 10, except that the 2D display is generally configured to provide a single view (e.g., one view similar to view 14) of a displayed image as opposed to the different views 14 of the multiview image provided by the multiview display 10.

A view direction or equivalently a light beam having a direction corresponding to a view direction of a multiview display generally has a principal angular direction or simply a 'direction' given by angular components $\{\theta, \phi\}$, by definition herein. The angular component $\theta$ referred to herein as the 'elevation component' or 'elevation angle' of the light beam. The angular component $\phi$ is referred to as the 'azimuth component' or 'azimuth angle' of the light beam. By definition, the elevation angle $\theta$ an angle in a vertical plane (e.g., perpendicular to a plane of the multiview display screen while the azimuth angle $\phi$ is an angle in a horizontal plane (e.g., parallel to the multiview display screen plane).

Figure 2:
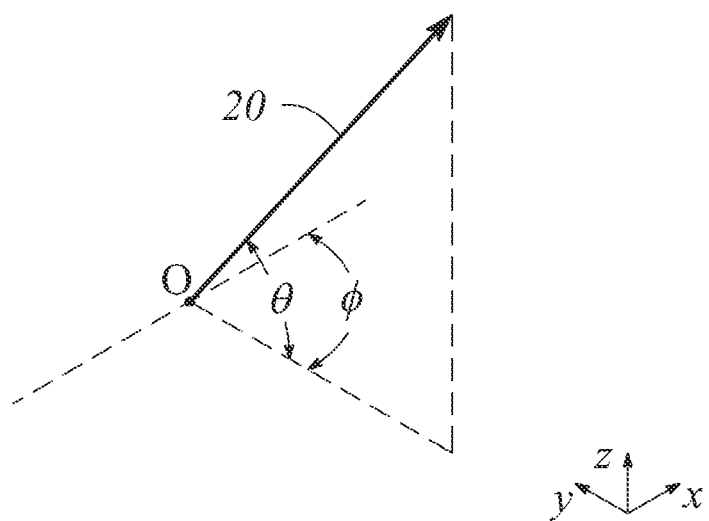
FIG. 2 illustrates a graphical representation of the angular components of a light beam having a particular principal angular direction corresponding to a view direction of a multiview display in an example, according to an embodiment consistent with the principles described herein.

FIG. 2 illustrates a graphical representation of the angular components $\{\theta, \phi\}$ of a light beam 20 having a particular principal angular direction corresponding to a view direction (e.g., view direction 16 in FIG. 1) of a multiview display in an example, according to an embodiment consistent with the principles described herein. In addition, the light beam 20 is emitted or emanates from a particular point, by definition herein. That is, by definition, the light beam 20 has a central ray associated with a particular point of origin within the multiview display. FIG. 2 also illustrates the light beam (or view direction) point of origin O.

Herein, the term 'multiview' as used in the terms 'multiview image' and 'multiview display' is defined as a plurality of views representing different perspectives or including angular disparity between views of the view plurality. In addition, herein the term 'multiview' may explicitly include more than two different views (i.e., a minimum of three views and generally more than three views). As such, 'multiview display' as employed herein may be explicitly distinguished from a stereoscopic display that includes only two different views to represent a scene or an image. Note however, while multiview images and multiview displays include more than two views, by definition herein, multiview images may be viewed (e.g., on a multiview display) as a stereoscopic pair of images by selecting only two of the multiview views to view at a time (e.g., one view per eye).

A 'multiview pixel' is defined herein as a set of pixels representing 'view' pixels in each of a similar plurality of different views of a multiview display. In particular, a multiview pixel may have an individual pixel or set of pixels corresponding to or representing a view pixel in each of the different views of the multiview image. By definition herein therefore, a 'view pixel' is a pixel or set of pixels corresponding to a view in a multiview pixel of a multiview display. In some embodiments, a view pixel may include one or more color sub-pixels. Moreover, the view pixels of the multiview pixel are so-called 'directional pixels' in that each of the view pixels is associated with a predetermined view direction of a corresponding one of the different views, by definition herein. Further, according to various examples and embodiments, the different view pixels a multiview pixel may have equivalent or at least substantially similar locations or coordinates in each of the different views. For example, a first multiview pixel may have individual view pixels located at $\{x1, y1\}$ in each of the different views of a multiview image, while a second multiview pixel may have individual view pixels located at $\{x2, y2\}$ in each of the different views, and so on.

Herein, a 'light guide' is defined as a structure that guides light within the structure using total internal reflection. In particular, the light guide may include a core that is substantially transparent at an operational wavelength of the light guide. The term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate or slab guide and a strip guide.

Further herein, the term 'plate' when applied to a light guide as in a 'plate light guide' is defined as a piece-wise or differentially planar layer or sheet, which is sometimes referred to as a 'slab' guide. In particular, a plate light guide is defined as a light guide configured to guide light in two substantially orthogonal directions bounded by a top surface and a bottom surface (i.e., opposite surfaces) of the light guide. Further, by definition herein, the top and bottom surfaces are both separated from one another and may be substantially parallel to one another in at least a differential sense. That is, within any differentially small section of the plate light guide, the top and bottom surfaces are substantially parallel or co-planar. In some embodiments, the plate light guide may be substantially flat (i.e., confined to a plane) and therefore, the plate light guide is a planar light guide. In other embodiments, the plate light guide may be curved in one or two orthogonal dimensions. For example, the plate light guide may be curved in a single dimension to form a cylindrical shaped plate light guide. However, any curvature has a radius of curvature sufficiently large to ensure that total internal reflection is maintained within the plate light guide to guide light.

By definition herein, a 'multibeam element' is a structure or element of a backlight or a display that produces emitted light that includes a plurality of directional light beams. In some embodiments, the multibeam element may be optically coupled to a light guide of a backlight to provide the plurality of light beams by coupling or scattering out a portion of light guided in the light guide. In other embodiments, the multibeam element may generate light emitted as the directional light beams (e.g., may comprise a light source). Further, the directional light beams of the plurality of directional light beams produced by a multibeam element have different principal angular directions from one another, by definition herein. In particular, by definition, a directional light beam of the plurality has a predetermined principal angular direction that is different from another directional light beam of the directional light beam plurality. Furthermore, the directional light beam plurality may represent a light field. For example, the directional light beam plurality may be confined to a substantially conical region of space or have a predetermined angular spread that includes the different principal angular directions of the directional light beams in the light beam plurality. As such, the predetermined angular spread of the directional light beams in combination (i.e., the light beam plurality) may represent the light field.

According to various embodiments, the different principal angular directions of the various directional light beams of the plurality are determined by a characteristic including, but not limited to, a size (e.g., length, width, area, etc.) and an orientation or rotation of the multibeam element. In some embodiments, the multibeam element may be considered an 'extended point light source', i.e., a plurality of point light sources distributed across an extent of the multibeam element, by definition herein. Further, a directional light beam produced by the multibeam element has a principal angular direction given by angular components $\{\theta, \phi\}$, by definition herein, and as described above with respect to FIG. 2.

Herein a 'collimator' is defined as substantially any optical device or apparatus that is configured to collimate light. According to various embodiments, an amount of collimation provided by the collimator may vary in a predetermined degree or amount from one embodiment to another. Further, the collimator may be configured to provide collimation in one or both of two orthogonal directions (e.g., a vertical direction and a horizontal direction). That is, the collimator may include a shape in one or both of two orthogonal directions that provides light collimation, according to some embodiments.

Herein, a 'collimation factor' is defined as a degree to which light is collimated. In particular, a collimation factor defines an angular spread of light rays within a collimated beam of light, by definition herein. For example, a collimation factor $\sigma$ may specify that a majority of light rays in a beam of collimated light is within a particular angular spread (e.g., $+/-\sigma$ degrees about a central or principal angular direction of the collimated light beam). The light rays of the collimated light beam may have a Gaussian distribution in terms of angle and the angular spread may be an angle determined by at one-half of a peak intensity of the collimated light beam, according to some examples.

Herein, a 'light source' is defined as a source of light (e.g., an optical emitter configured to produce and emit light). For example, the light source may comprise an optical emitter such as a light emitting diode (LED) that emits light when activated or turned on. In particular, herein the light source may be substantially any source of light or comprise substantially any optical emitter including, but not limited to, one or more of a light emitting diode (LED), a laser, an organic light emitting diode (OLED), a polymer light emitting diode, a plasma-based optical emitter, a fluorescent lamp, an incandescent lamp, and virtually any other source of light. The light produced by the light source may have a color (i.e., may include a particular wavelength of light), or may be a range of wavelengths (e.g., white light). In some embodiments, the light source may comprise a plurality of optical emitters. For example, the light source may include a set or group of optical emitters in which at least one of the optical emitters produces light having a color, or equivalently a wavelength, that differs from a color or wavelength of light produced by at least one other optical emitter of the set or group. The different colors may include primary colors (e.g., red, green, blue) for example.

As used herein, the article 'a' is intended to have its ordinary meaning in the patent arts, namely 'one or more'. For example, 'a reflective multibeam element' means one or more reflective multibeam element and as such, 'the reflective multibeam element' means 'reflective multibeam element(s)' herein. Also, any reference herein to 'top', 'bottom', 'upper', 'lower', 'up', 'down', 'front', 'back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 3A:
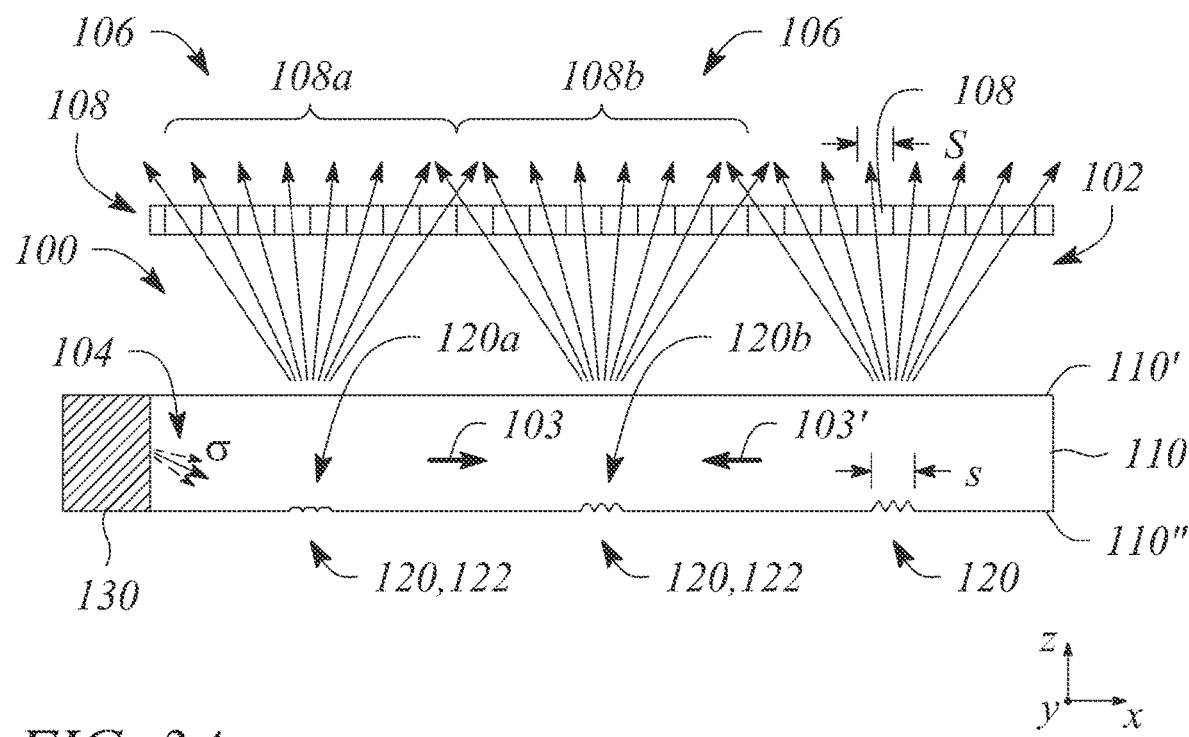
FIG. 3A illustrates a cross sectional view of a multiview backlight in an example, according to an embodiment consistent with the principles described herein.
Figure 3B:
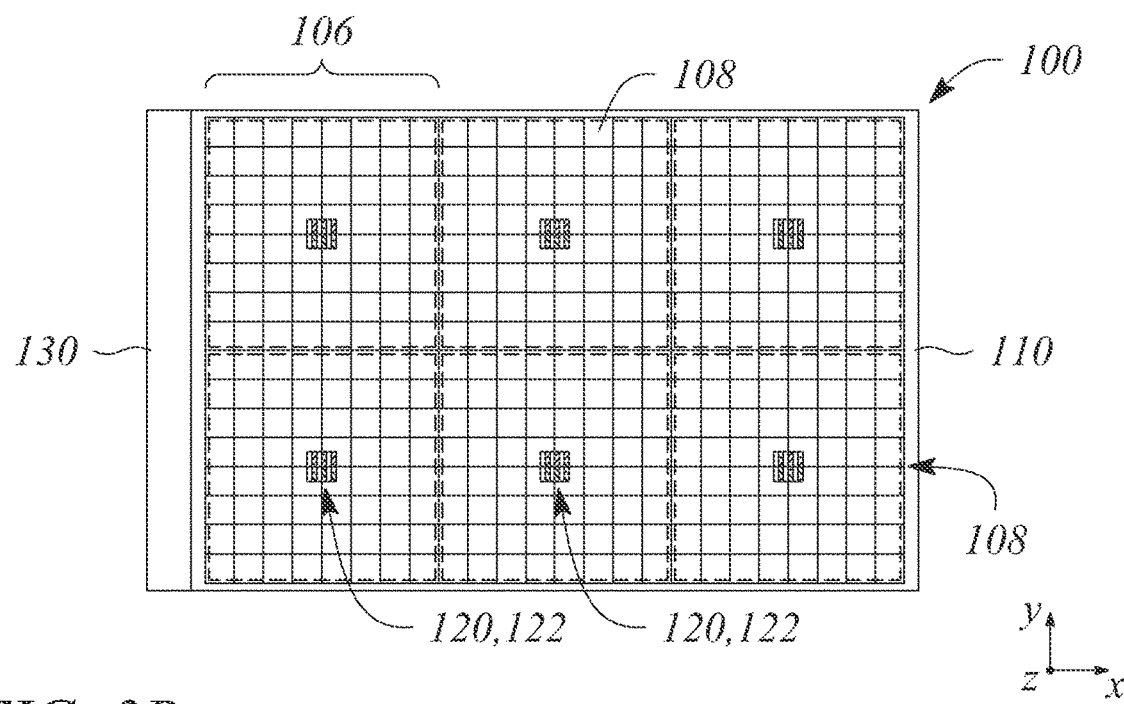
FIG. 3B illustrates a plan view of a multiview backlight in an example, according to an embodiment consistent with the principles described herein.
Figure 3C:
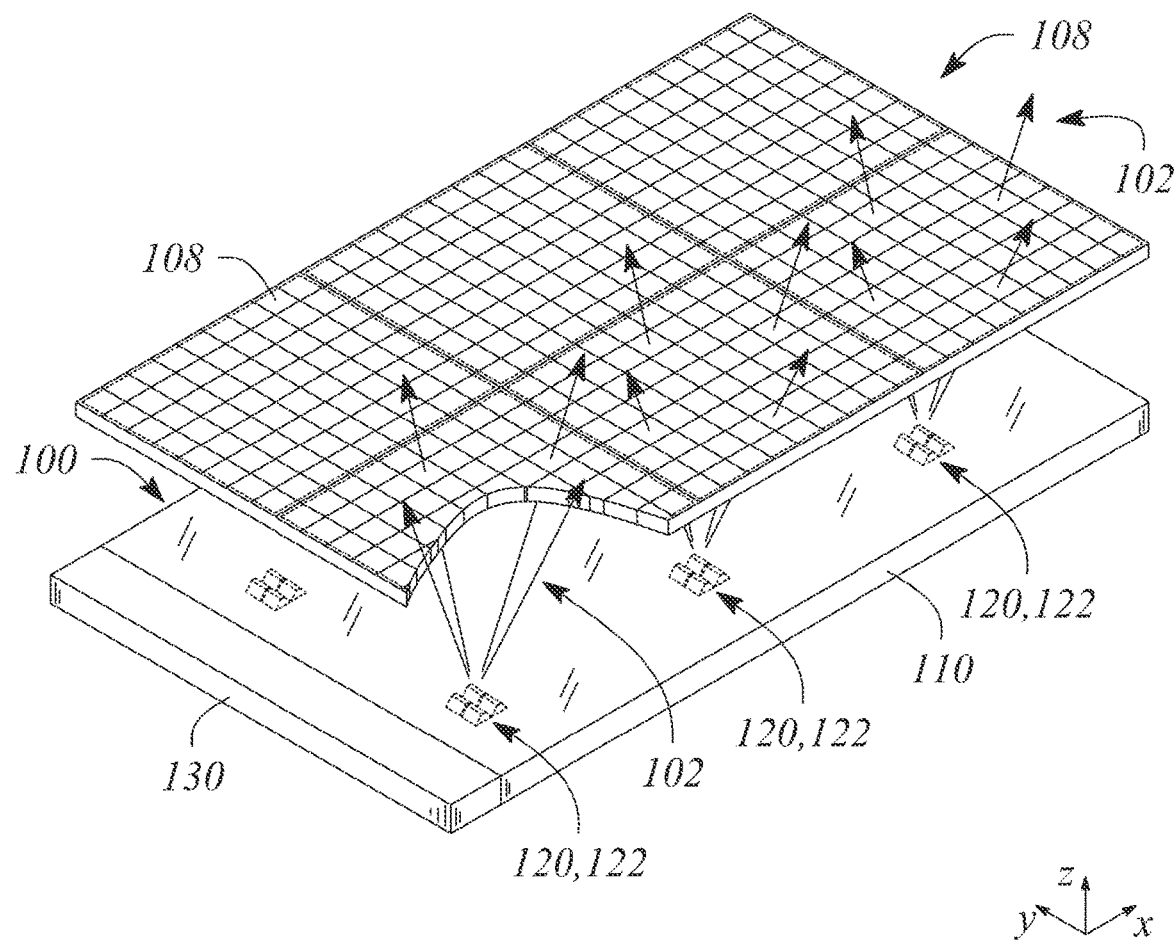
FIG. 3C illustrates a perspective view of a multiview backlight in an example, according to an embodiment consistent with the principles described herein.

According to some embodiments of the principles described herein, a multiview backlight is provided. FIG. 3A illustrates a cross sectional view of a multiview backlight 100 in an example, according to an embodiment consistent with the principles described herein. FIG. 3B illustrates a plan view of a multiview backlight 100 in an example, according to an embodiment consistent with the principles described herein. FIG. 3C illustrates a perspective view of a multiview backlight 100 in an example, according to an embodiment consistent with the principles described herein. The perspective view in FIG. 3C is illustrated with a partial cut-away to facilitate discussion herein only.

The multiview backlight 100 illustrated in FIGS. 3A-3C is configured to provide emitted light 102 comprising directional light beams having different principal angular directions from one another (e.g., as or representing a light field). In particular, the directional light beams of the emitted light 102 are reflectively scattered out of the multiview backlight 100 and directed away from the multiview backlight 100 in different directions corresponding to respective view directions of a multiview display or equivalently different view directions of a multiview image displayed by the multiview display. In some embodiments, the directional light beams of the emitted light 102 may be modulated (e.g., using light valves, as described below) to facilitate the display of information having multiview content, e.g., a multiview image. The multiview image may represent or include three-dimensional (3D) content, for example. FIGS. 3A-3C also illustrate a multiview pixel 106 comprising an array of light valves 108. A surface of the multiview backlight 100 through which the directional light beams of the emitted light 102 are reflectively scattered out of and toward the light valves 108 may be referred to as an 'emission surface' of the multiview backlight 100.

As illustrated in FIGS. 3A-3C, the multiview backlight 100 comprises a light guide 110. The light guide 110 is configured to guide light in a first propagation direction 103 along a length of the light guide 110 as guided light 104 having or according to a predetermined collimation factor σ. For example, the light guide 110 may include a dielectric material configured as an optical waveguide. The dielectric material may have a first refractive index that is greater than a second refractive index of a medium surrounding the dielectric optical waveguide. The difference in refractive indices may be configured to facilitate total internal reflection of the guided light 104 according to one or more guided modes of the light guide 110.

In some embodiments, the light guide 110 may be a slab or plate optical waveguide (i.e., a plate light guide) comprising an extended, substantially planar sheet of optically transparent, dielectric material. The substantially planar sheet of dielectric material is configured to guide the guided light 104 using total internal reflection. According to various examples, the optically transparent material of the light guide 110 may include or be made up of any of a variety of dielectric materials including, but not limited to, one or more of various types of glass (e.g., silica glass, alkali-aluminosilicate glass, borosilicate glass, etc.) and substantially optically transparent plastics or polymers (e.g., poly(methyl methacrylate) or 'acrylic glass', polycarbonate, and others). In some embodiments, the light guide 110 may further include a cladding layer (not illustrated) on at least a portion of a surface (e.g., one or both of the top surface and the bottom surface) of the light guide 110. The cladding layer may be used to further facilitate total internal reflection, according to some examples. In particular, the cladding may comprise a material having an index of refraction that is greater than an index of refraction of the light guide material.

Further, according to some embodiments, the light guide 110 is configured to guide the guided light 104 according to total internal reflection at a non-zero propagation angle between a first surface 110' (e.g., 'front' or 'top' surface or side) and a second surface 110" (e.g., 'back' or 'bottom' surface or side) of the light guide 110. In particular, the guided light 104 propagates as a guided light beam by reflecting or 'bouncing' between the first surface 110' and the second surface 110" of the light guide 110 at the non-zero propagation angle. In some embodiments, the guided light 104 may include a plurality of guided light beams representing different colors of light. The different colors of light may be guided by the light guide 110 at respective ones of different color-specific, nonzero propagation angles. Note, the non-zero propagation angle is not illustrated in FIGS. 3A-3C for simplicity of illustration. However, a bold arrow representing the first propagation direction 103 depicts a general propagation direction of the guided light 104 along the light guide length in FIG. 3A.

As defined herein, a 'non-zero propagation angle' is an angle relative to a surface (e.g., the first surface 110' or the second surface 110") of the light guide 110. Further, the non-zero propagation angle is both greater than zero and less than a critical angle of total internal reflection within the light guide 110, according to various embodiments. For example, the non-zero propagation angle of the guided light 104 may be between about ten (10) degrees and about fifty (50) degrees or, In some embodiments, between about twenty (20) degrees and about forty (40) degrees, or between about twenty-five (25) degrees and about thirty-five (35) degrees. For example, the non-zero propagation angle may be about thirty (30) degrees. In other examples, the non-zero propagation angle may be about 20 degrees, or about 25 degrees, or about 35 degrees. Moreover, a specific non-zero propagation angle may be chosen (e.g., arbitrarily) for a particular implementation as long as the specific non-zero propagation angle is chosen to be less than the critical angle of total internal reflection within the light guide 110.

The guided light 104 in the light guide 110 may be introduced or directed into the light guide 110 at the non-zero propagation angle (e.g., about 30-35 degrees). In some embodiments, a structure such as, but not limited to, a lens, a mirror or similar reflector (e.g., a tilted collimating reflector), a diffraction grating, and a prism (not illustrated) as well as various combinations thereof may be employed to introduce light into the light guide 110 as the guided light 104. In other examples, light may be introduced directly into the input end of the light guide 110 either without or substantially without the use of a structure (i.e., direct or 'butt' coupling may be employed). Once directed into the light guide 110, the guided light 104 is configured to propagate along the light guide 110 in the first propagation direction 103 that is generally away from the input end.

Further, the guided light 104, having the predetermined collimation factor σ may be referred to as a 'collimated light beam' or 'collimated guided light.' Herein, a 'collimated light' or a 'collimated light beam' is generally defined as a beam of light in which rays of the light beam are substantially parallel to one another within the light beam (e.g., the guided light beam), except as allowed by the collimation factor σ. Further, rays of light that diverge or are scattered from the collimated light beam are not considered to be part of the collimated light beam, by definition herein.

In some embodiments, the light guide 110 may be configured to 'recycle' the guided light 104. In particular, the guided light 104 that has been guided along the light guide length in the first propagation direction 103 may be redirected back along that length in another or second propagation direction 103' that differs from the first propagadirection 103. For example, the light guide 110 may include a reflector (not illustrated) at an end of the light guide 110 opposite to an input end adjacent to the light source. The reflector may be configured to reflect the guided light 104 back toward the input end as recycled guided light 104. In some embodiments, another light source may provide guided light 104 in the other or second propagation direction 103' instead of or in addition to light recycling (e.g., using a reflector). One or both of recycling the guided light 104 and using another light source to provide guided light 104 having the second propagation direction 103' may increase a brightness of the multiview backlight 100 (e.g., increase an intensity of the directional light beams of the emitted light 102) by making guided light 104 available more than once or from more than one direction, for example, to reflective multibeam elements, described below. Guided light 104 (e.g., a collimated guided light beam) propagating in each of the first and second propagation directions 103, 103' may have or be collimated according to the same predetermined collimation factor σ, according to some embodiments. In other embodiments, the guided light 104 propagating in the second propagation direction 103' may have a predetermined collimation factor that differs from the predetermined collimation factor σ of guided light 104 propagating in the first propagation direction 103. In FIG. 3A, a bold arrow is illustrated indicating the second propagation direction 103' of guided light 104 (e.g., directed in a negative x-direction).

As illustrated in FIGS. 3A-3C, the multiview backlight 100 further comprises an array of reflective multibeam elements 120 spaced apart from one another across the light guide 110. In particular, the reflective multibeam elements 120 of the array are separated from one another by a finite space and represent individual, distinct elements across the light guide 110. That is, by definition herein, the reflective multibeam elements 120 of the array are spaced apart from one another according to a finite (i.e., non-zero) inter-element distance (e.g., a finite center-to-center distance). Further, the reflective multibeam elements 120 of the array generally do not intersect, overlap or otherwise touch one another, according to some embodiments. That is, each reflective multibeam element 120 of the array is generally distinct and separated from other ones of the reflective multibeam elements 120. In some embodiments, the reflective multibeam elements 120 may be spaced apart by a distance that is greater than a size of individual ones of reflective multibeam elements 120.

According to some embodiments, the reflective multibeam elements 120 of the array may be arranged in either a one-dimensional (1D) array or a two-dimensional (2D) array. For example, the reflective multibeam elements 120 may be arranged as a linear 1D array (e.g., a plurality of lines comprising staggered lines of reflective multibeam elements 120). In another example, the reflective multibeam elements 120 may be arranged as a rectangular 2D array or as a circular 2D array. Further, the array (i.e., 1D or 2D array) may be a regular or uniform array, in some embodiments. In particular, an inter-element distance (e.g., center-to-center distance or spacing) between the reflective multibeam elements 120 may be substantially uniform or constant across the array. In other examples, the inter-element distance between the reflective multibeam elements 120 may be varied one or both of across the array, along the length of the light guide 110, or across the light guide 110.

According to various embodiments, each reflective multibeam element 120 of the reflective multibeam element array comprises a plurality of reflective sub-elements 122. Furthermore, each reflective multibeam element 120 of the reflective multibeam element array is configured to reflectively scatter out a portion of the guided light 104 as emitted light 102 comprising the directional light beams. In particular, the guided light portion is reflectively scattered out collectively by reflective sub-elements of the reflective multibeam element 120 using reflection or reflective scattering, according to various embodiments. FIGS. 3A and 3C illustrate the directional light beams of the emitted light 102 as a plurality of diverging arrows directed way from the first surface 110' (i.e., emission surface) of the light guide 110.

According to various embodiments, a size of each of the reflective multibeam elements 120 that includes within the size the reflective sub-element plurality (e.g., as illustrated a lower-case 's' in FIG. 3A) is comparable to a size of a light valve 108 (e.g., as illustrated by an upper-case 'S' in FIG. 3A) in a multiview display. Herein, the 'size' may be defined in any of a variety of manners to include, but not be limited to, a length, a width or an area. For example, the size of a light valve 108 may be a length thereof and the comparable size of the reflective multibeam element 120 may also be a length of the reflective multibeam element 120. In another example, the size may refer to an area such that an area of the reflective multibeam element 120 may be comparable to an area of the light valve 108.

In some embodiments, a size of each reflective multibeam element 120 is between about twenty-five percent (25%) and about two hundred percent (200%) of a size of a light valve 108 in light valve array of the multiview display. In other examples, the reflective multibeam element size is greater than about fifty percent (50%) of the light valve size, or greater than about sixty percent (60%) of the light valve size, or greater than about seventy percent (70%) of the light valve size, or greater than about seventy-five percent (75%) of the light valve size, or greater than about eighty percent (80%) of the light valve size, or greater than about eighty-five percent (85%) of the light valve size, or greater than about ninety percent (90%) of the light valve size. In other examples, the reflective multibeam element size is less than about one hundred eighty percent (180%) of the light valve size, or less than about one hundred sixty percent (160%) of the light valve size, or less than about one hundred forty percent (140%) of the light valve size, or less than about one hundred twenty percent (120%) of the light valve size. According to some embodiments, the comparable sizes of the reflective multibeam element 120 and the light valve 108 may be chosen to reduce, or in some embodiments to minimize, dark zones between views of the multiview display. Moreover, the comparable sizes of the reflective multibeam element 120 and the light valve 108 may be chosen to reduce, and in some embodiments to minimize, an overlap between views (or view pixels) of the multiview display. FIGS. 3A-3C illustrate an array of light valves 108 configured to modulate the directional light beams of the emitted light 102. The light valve array may be part of a multiview display that employs the multiview backlight 100, for example. The array of light valves 108 is illustrated in FIGS. 3A-3C along with the multiview backlight 100 for the purpose of facilitating discussion.

As illustrated in FIGS. 3A-3C, different ones of the directional light beams of the emitted light 102 having different principal angular directions pass through and may be modulated by different ones of the light valves 108 in the light valve array. Further, as illustrated, a light valve 108 of the array corresponds to a sub-pixel of the multiview pixel 106, and a set of the light valves 108 may correspond to a multiview pixel 106 of the multiview display. In particular, in some embodiments a different set of light valves 108 of the light valve array is configured to receive and modulate the directional light beams of the emitted light 102 provided by or from a corresponding one of the reflective multibeam elements 120, i.e., there is one unique set of light valves 108 for each reflective multibeam element 120, as illustrated. In various embodiments, different types of light valves may be employed as the light valves 108 of the light valve array including, but not limited to, one or more of liquid crystal light valves, electrophoretic light valves, and light valves based on electrowetting.

Note that, as illustrated in FIG. 3A, the size of a sub-pixel of a multiview pixel 106 may correspond to a size of a light valve 108 in the light valve array. In other examples, the light valve size may be defined as a distance (e.g., a center-to-center distance) between adjacent light valves 108 of the light valve array. For example, the light valves 108 may be smaller than the center-to-center distance between the light valves 108 in the light valve array. The light valve size may be defined as either the size of the light valve 108 or a size corresponding to the center-to-center distance between the light valves 108, for example.

In some embodiments, a relationship between the reflective multibeam elements 120 and corresponding multiview pixels 106 (i.e., sets of sub-pixels and corresponding sets of light valves 108) may be a one-to-one relationship. That is, there may be an equal number of multiview pixels 106 and reflective multibeam elements 120. FIG. 3B explicitly illustrates by way of example the one-to-one relationship where each multiview pixel 106 comprising a different set of light valves 108 is illustrated as surrounded by a dashed line. In other embodiments (not illustrated), the number of multiview pixels 106 and the number of reflective multibeam elements 120 may differ from one another.

In some embodiments, an inter-element distance (e.g., center-to-center distance) between a pair of reflective multibeam elements 120 of the plurality may be equal to an inter-pixel distance (e.g., a center-to-center distance) between a corresponding pair of multiview pixels 106, e.g., represented by light valve sets. For example, as illustrated in FIG. 3A, a center-to-center distance between the first reflective multibeam element 120a and the second reflective multibeam element 120b is substantially equal to a center-to-center distance between the first light valve set 108a and the second light valve set 108b. In other embodiments (not illustrated), the relative center-to-center distances of pairs of reflective multibeam elements 120 and corresponding light valve sets may differ, e.g., the reflective multibeam elements 120 may have an inter-element spacing that is one of greater than or less than a spacing between light valve sets representing multiview pixels 106.

In some embodiments, a shape of the reflective multibeam element 120 is analogous to a shape of the multiview pixel 106 or equivalently, to a shape of a set (or 'sub-array') of the light valves 108 corresponding to the multiview pixel 106. For example, the reflective multibeam element 120 may have a square shape and the multiview pixel 106 (or an arrangement of a corresponding set of light valves 108) may be substantially square. In another example, the reflective multibeam element 120 may have a rectangular shape, i.e., may have a length or longitudinal dimension that is greater than a width or transverse dimension. In this example, the multiview pixel 106 (or equivalently the arrangement of the set of light valves 108) corresponding to the reflective multibeam element 120 may have an analogous rectangular shape. FIG. 3B illustrates a top or plan view of square-shaped reflective multibeam elements 120 and corresponding square-shaped multiview pixels 106 comprising square sets of light valves 108. In yet other examples (not illustrated), the reflective multibeam elements 120 and the corresponding multiview pixels 106 have various shapes including or at least approximated by, but not limited to, a triangular shape, a hexagonal shape, and a circular shape.

Further (e.g., as illustrated in FIG. 3A), each reflective multibeam element 120 is configured to provide directional light beams of the emitted light 102 to one and only one multiview pixel 106, according to some embodiments. In particular, for a given one of the reflective multibeam elements 120, the directional light beams having different principal angular directions corresponding to the different views of the multiview display are substantially confined to a single corresponding multiview pixel 106 and the sub-pixels thereof, i.e., a single set of light valves 108 corresponding to the reflective multibeam element 120, as illustrated in FIG. 3A. As such, each reflective multibeam element 120 of the multiview backlight 100 provides a corresponding set of directional light beams of the emitted light 102 that has a set of the different principal angular directions corresponding to the different views of the multiview display (i.e., the set of directional light beams contains a light beam having a direction corresponding to each of the different view directions).

In particular, as illustrated in FIG. 3A, a first light valve set 108a is configured to receive and modulate the directional light beams of the emitted light 102 from the first reflective multibeam element 120a. Further, the second light valve set 108b is configured to receive and modulate the directional light beams of the emitted light 102 from a second reflective multibeam element 120b. As a result, each of the light valve sets (e.g., the first and second light valve sets 108a, 108b) in the light valve array corresponds, respectively, both to a different reflective multibeam element 120 (e.g., elements 120a, 120b) and to a different multiview pixel 106, with individual light valves 108 of the light valve sets corresponding to the sub-pixels of the respective multiview pixels 106.

In some embodiments, a reflective multibeam element 120 of the reflective multibeam element array may be disposed on or at a surface of the light guide 110. For example, the reflective multibeam element 120 may be disposed on the second surface 110" opposite to the emission surface (e.g., first surface 110') of the light guide 110. In some of these embodiments, a reflective sub-element 122 of the reflective sub-element plurality may extend into an interior of the light guide 110. In other embodiments where the reflective multibeam element 120 is disposed on the light guide surface, a reflective sub-element 122 may protrude from the light guide surface and away from the interior of the light guide 110. In some embodiments, such as when the reflective sub-element 122 protrudes from the light guide surface, the reflective sub-element 122 may comprise a material of the light guide 110. In other embodiments, the reflective sub-element 122 may comprise another material, e.g., a dielectric material. In some of these embodiments, the other material may be index-matched to a refractive index to the light guide material to reduce or substantially minimize reflection of light at an interface between the light guide 110 and the reflective sub-element 122. In another embodiment, the other material may have a refractive index that is higher than a refractive index of the light guide material. Such a higher index material or material layer may be used to improve brightness of the emitted light 102, for example. In other embodiments (not illustrated), the reflective multibeam element 120 may be located within the light guide 110. In particular, the reflective sub-element plurality of the reflective multibeam element 120 may be between and spaced away from both of the first surface 110' and the second surface 110" of the light guide 110, in these embodiments.

Figure 4A:
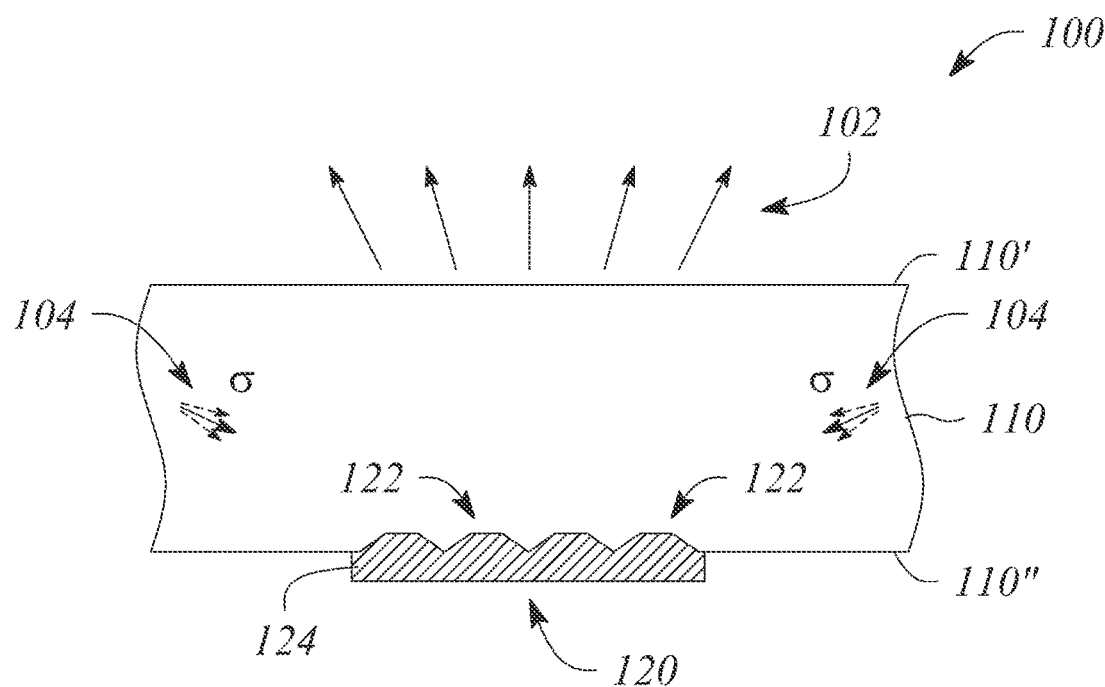
FIG. 4A illustrates a cross-sectional view of a portion of a multiview backlight in an example, according to an embodiment of the principles described herein.

FIG. 4A illustrates a cross-sectional view of a portion of a multiview backlight 100 in an example, according to an embodiment of the principals described herein. As illustrated in FIG. 4A, the multiview backlight 100 comprises the light guide 110 with a reflective multibeam element 120 disposed on the second surface 110" of the light guide 110. The reflective multibeam element 120 illustrated in FIG. 4A comprises the reflective sub-element plurality having reflective sub-elements that extend into an interior of the light guide 110. Guided light 104 is reflected by the reflective sub-elements 122 and exits the emission surface of the light guide 110 (first surface 110') as the emitted light 102 comprising the directional light beams.

Figure 4B:
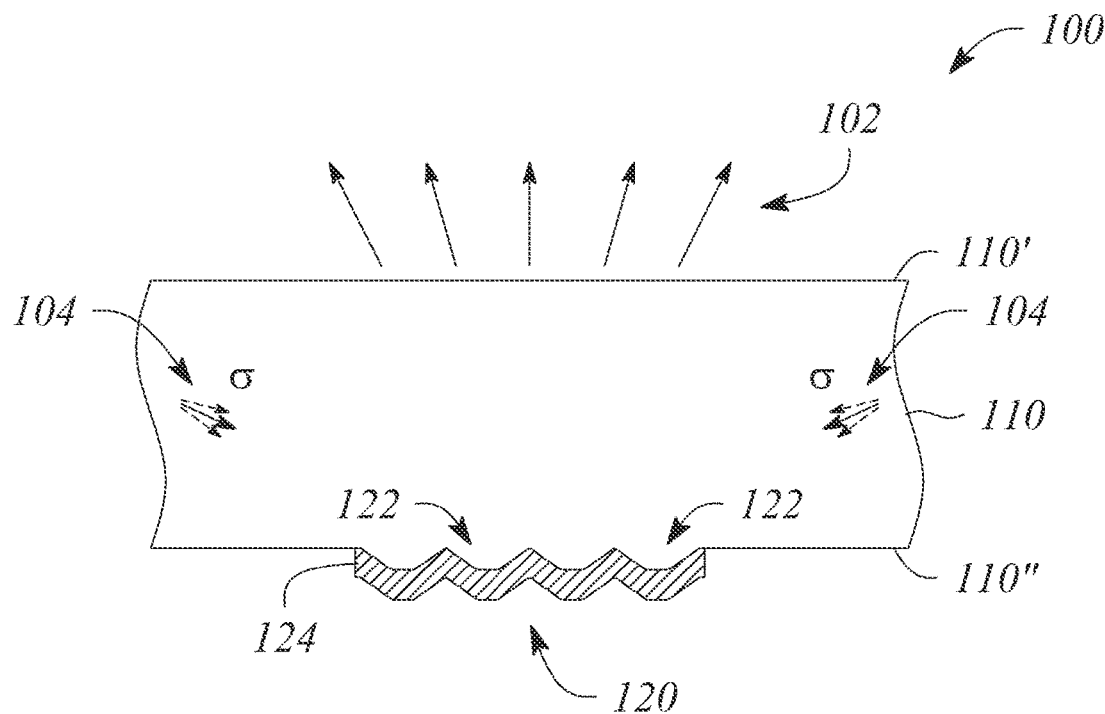
FIG. 4B illustrates a cross-sectional view of a portion of a multiview backlight in an example, according to another embodiment of the principles described herein.

FIG. 4B illustrates a cross-sectional view of a portion of a multiview backlight 100 in an example, according to another embodiment of the principals described herein. As illustrated in FIG. 4B, the multiview backlight 100 also comprises the light guide 110 with a reflective multibeam element 120 disposed on the second surface 110" of the light guide 110. However, in FIG. 4B the reflective multibeam element 120 comprises the reflective sub-element plurality having reflective sub-elements that protrude from the light guide surface and away from the interior of the light guide 110. As in FIG. 4A, guided light 104 is illustrated in FIG. 4B as being reflected by the reflective sub-elements 122 and exiting the emission surface of the light guide 110 (first surface 110') as the emitted light 102 comprising the directional light beams.

Note that while all of the reflective sub-elements 122 of the reflective multibeam element 120 illustrated in FIG. 4A and FIG. 4B are depicted as being similar to one another, in some embodiments (not illustrated) reflective sub-elements 122 of the reflective sub-element plurality may differ from one another. For example, the reflective sub-elements 122 may have one or more of different sizes, different cross-sectional profiles, and even different orientations (e.g., a rotation relative to the guided light propagation directions) within and across the reflective multibeam element 120. In another example, a first reflective sub-element 122 may extend into the light guide interior and a second reflective sub-element 122 may protrude away from the light guide surface within a reflective multibeam element 120. In particular, at least two reflective sub-elements 122 of the reflective sub-element plurality may have different reflective scattering profiles from one another within the emitted light 102, according to some embodiments.

In some embodiments, a reflective multibeam element 120 of the reflective multibeam element array may further comprise a reflective material adjacent to and coating reflective surfaces of the plurality of reflective sub-elements 122. In some embodiments, an extent of the reflective material may be confined to or substantially confined to an extent or boundary of the reflective multibeam element 120 to form a reflective island.

FIG. 4A illustrates, by way of example and not limitation, a reflective material 124 as a reflective material layer that fills the reflective sub-elements 122 of the reflective sub-element plurality. Further, the reflective material layer has an extent that is confined to the extent of the reflective multibeam element 120, forming a reflective island, as illustrated. In other embodiments (not illustrated), the reflective material layer may be configured to coat reflective surfaces of but not fill or substantially fill the reflective sub-elements 122 that extend into the light guide interior.

FIG. 4B illustrates a reflective material 124 as a reflective material layer configured to coat a reflective surface of the illustrated reflective sub-elements 122 of the reflective sub-element plurality. In other embodiments (not illustrated), the reflective material layer may form a reflective island around the reflective sub-elements 122 that protrude away from the light guide surface in a manner similar to that illustrated in FIG. 4A.

In various embodiments, any of a number of reflective materials such as, but not limited to, reflective metals (e.g., aluminum, nickel, silver, gold, etc.) and various reflective-metal polymers (e.g., polymer-aluminum) may be employed as the reflective material 124. The reflective material layer of the reflective material 124 may be applied by a variety of methods including, but not limited to, spin coating, evaporative deposition, and sputtering, for example. Photolithography or similar lithographic methods may be employed to define an extent of the reflective material layer after deposition to confine the reflective material 124 to an extent of the reflective multibeam element 120 and form the reflective island, according to some embodiments.

As mentioned above, reflective sub-elements 122 of the reflective sub-element plurality of a reflective multibeam element 120 may have different cross-sectional profiles. In particular, the cross-sectional profiles may exhibit a variety of reflective scattering surfaces with one or both of various slope angles and various surface curvatures to control an emission pattern of the reflective multibeam element 120. For example, in some embodiments a reflective sub-element 122 of the reflective sub-element plurality may comprise a reflective facet having a slope angle configured to control an emission pattern of the directional light beams within the emitted light 102. The slope angle may be between about ten degrees (10°) and about fifty degrees (50°) or between about twenty-five degrees (25°) and about forty-five degrees (45°) relative to the light guide surface, for example. In another example, a reflective sub-element 122 of the reflective sub-element plurality may have a curved reflective surface. A curvature or curve radius of the curved reflective surface in the cross-sectional profile of the reflective sub-element 122 may be configured to control the emission pattern of the directional light beams, in these embodiments.

In some embodiments, the light guide 110 of the multiview backlight 100 is further configured to guide light in the second propagation direction 103' opposite to the first propagation direction 103. In some of these embodiments, reflective sub-elements 122 of the reflective sub-element plurality may be configured to reflectively scatter out a portion of the guided light 104 having the second propagation direction 103' as emitted light 102 comprising directional light beams having directions corresponding to respective view directions of a multiview display. In particular, the reflectively scattered out guided light portion from the guided light 104 having the second propagation direction 103' may be configured to combine with the reflectively scattered out guided light portion from the guided light 104 having the first propagation direction 103 scattered out by the reflective sub-elements 122. Combining the reflectively scattered out light may one or both of provide greater intensity of the emitted light 102 and provide a symmetrical scattering profile of the directional light beams within the emitted light 102, according to some embodiments. FIGS. 4A-4B illustrate guided light 104 having two propagation directions (e.g., both the first and second propagation directions 103, 103' illustrated in FIG. 3A) as well as reflective sub-elements 122 within the illustrated reflective multibeam element 120 configured to reflectively scatter out guided light portions with both propagation directions.

Figure 5:
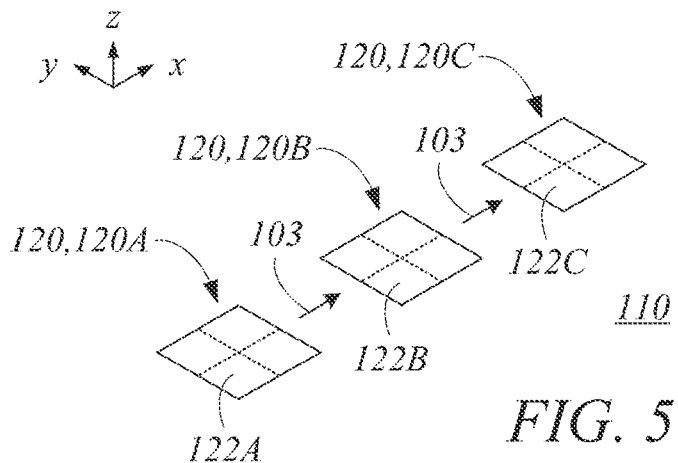
FIG. 5 illustrates a perspective view of three reflective multibeam elements in an example, according to an embodiment consistent with the principles described herein.

FIG. 5 illustrates a perspective view of a plurality of reflective multibeam elements 120 in an example, according to an embodiment consistent with the principles described herein. The plurality of reflective multibeam elements 120 illustrated in FIG. 5 include reflective sub-elements that are spaced along a length of the light guide 110. In the example of FIG. 5, a first reflective multibeam element 120A can include a first reflective sub-element 122A, a second reflective multibeam element 120B can include a second reflective sub-element 122B, and a third reflective multibeam element 120C can include a third reflective sub-element 122C. It will be understood that more or fewer than three reflective multibeam elements 120 and more or fewer than three corresponding reflective sub-elements 122 can be used.

Because each reflective sub-element reflectively scatters out a portion of the guided light from the light guide 110, the amount of optical power in the guided light can decrease along the length of the light guide 110. For example, the amount of optical power in the guided light can be relatively high at portions of the light guide that are close to the light source 130, and relatively low at other portions of the light guide that are farther away from the light source 130. If all of the reflective multibeam elements 120 were identical in structure and equally spaced over an area of the light guide 110, this reduction in optical power could lead to more optical power being reflectively scattered by reflective multibeam elements 120 that are close to the light source 130, and less optical power being reflectively scattered by reflective multibeam elements 120 that are farther away from the light source 130, which could lead to non-uniform brightness over an area of the multiview display.

To improve the uniformity in brightness over the area of the multiview display, the reflective multibeam elements 120 can have reflective sub-elements 122 that have reflective surfaces that vary in size among different instances of the reflective multibeam elements 120, such as can be distributed over an area of the light guide 110. For example, a particular reflective sub-element 122 that is positioned relatively far from the light source 130 can have a reflective surface that is larger than that of a different reflective sub-element 122 that positioned closer to the light source 130.

In addition, the reflective multibeam elements 120 can optionally be positioned in a regular pattern across an area of the light guide, such as in a periodic or repeating pattern, in a rectangular array, or in a regular or irregular pattern having a uniform or substantially uniform density across an area of the light guide 110. Compared to a pattern in which the density of the reflective multibeam elements 120 varies across an area of the light guide 110, the uniform pattern can help reduce or eliminate artifacts, such as aliasing, in a display that receives illumination from the light guide 110.

In the example of FIG. 5, because the first reflective multibeam element 120A can reflectively scatter out a portion of the guided light from the light guide 110, there may be less guided light available for the second reflective multibeam element 120B. As a result, to at least partially compensate for the reduction in guided light, the second reflective sub-element 122B can have a reflective surface that has a larger surface area than a reflective surface of the first reflective sub-element 122A, so that the optical power (or intensity, or beam intensity) reflectively scattered by the second reflective sub-element 122B is comparable (or equal, or nearly equal) to the optical power (or intensity, or beam intensity) reflectively scattered by the first reflective sub-element 122A. Similarly, the third reflective sub-element 122C can have a reflective surface that has a larger surface area than the reflective surface of the second reflective sub-element 122B.

In some embodiments, such as the examples shown in FIGS. 6A-6L and described below, the reflective surfaces of the reflective sub-elements 122 can be rectangular, or substantially rectangular, although other shapes can also be used. For configurations in which the reflective surfaces are rectangular, or substantially rectangular, the reflective surfaces can be arranged to have an edge that is parallel or substantially parallel to a guiding surface of the light guide 110, and opposing edges that are parallel or substantially parallel to the guiding surface of the light guide 110.

Each reflective sub-element 122 can include one or more protrusions at a guiding surface of the light guide 110, such as can extend a respective protrusion distance, or height. In an example, a protrusion can include a feature that protrudes or extends into an interior of the light guide 110. In an example, a protrusion can include a feature that protrudes or extends away from the interior of the light guide 110. Each reflective multibeam element 120 can have a respective width in a direction parallel to the guiding surface of the light guide 110 (e.g., along the y-direction or in the x-y plane of FIG. 5). The widths and the protrusion distances for the various sub-elements can be selected such that the emitted light optical power levels can be substantially equal for at least some of the reflective multibeam elements 120.

In some embodiments, each reflective multibeam element 120 can reflectively scatter respective emitted light that has a respective emitted light optical power level. In some embodiments, the protrusion distances can be selected such that the emitted light optical power levels can be equal or substantially equal for at least some of the reflective multibeam elements 120. For example, the emitted light power levels can be within 10% of one another, within 5% of one another, within 2% of one another, within 1% of one another, or another suitable value.

In some embodiments, at least some of the protrusion distances can vary as a function of distance along the length of the light guide 110. For example, the protrusion distances can increase in a first propagation direction 103 along the length of the light guide 110. Such a variation in protrusion distance can help reduce variation in brightness, perceived brightness, intensity, optical power, or another suitable quantity over an area of the light guide 110.

FIGS. 6A-6F show examples of variations in protrusion distance along the length of the light guide 110. FIGS. 6A-6F all show cross-sectional views of examples of reflective sub-elements, with the cross-sections being taken parallel to a length of the light guide 110 (e.g., along the first propagation direction 103 of FIG. 5) and orthogonal to the second surface 110" of the light guide 110.

Figures 6A, 6B, 6C:
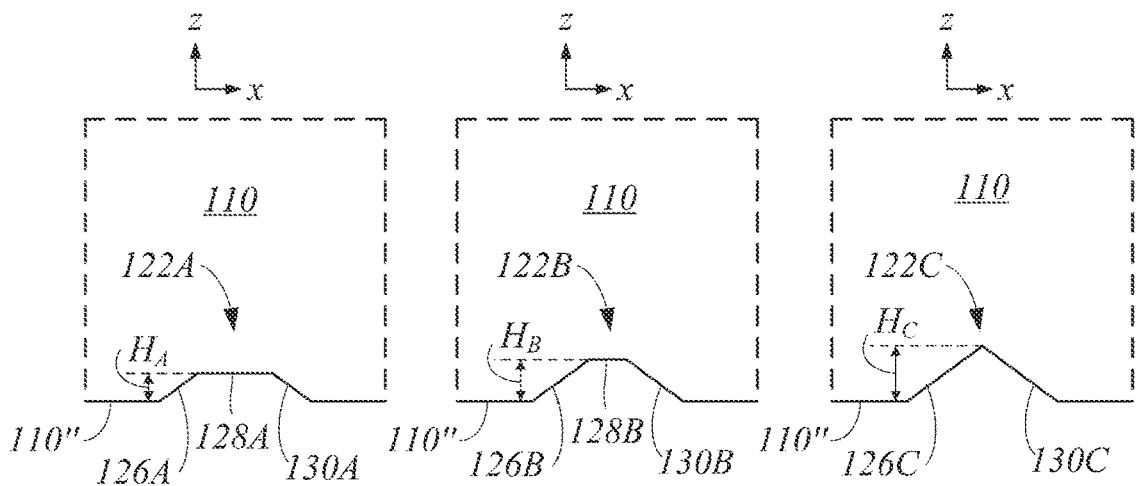
FIG. 6A illustrates a cross-sectional view of the first reflective sub-element in an example, according to an embodiment consistent with the principles described herein.
FIG. 6B illustrates a cross-sectional view of the second reflective sub-element in an example, according to an embodiment consistent with the principles described herein.
FIG. 6C illustrates a cross-sectional view of the third reflective sub-element in an example, according to an embodiment consistent with the principles described herein.

In FIGS. 6A-6C, the reflective sub-elements extend into the interior of the light guide 110. That is, the reflective sub-elements illustrated in the examples of FIGS. 6A-6C include protrusions that extend inwardly, such as from the second surface 110" toward the first surface 110' of the light guide 110. The examples of FIGS. 6A-6C illustrate a first group of spaced multibeam elements corresponding respectively to 122A, 122B, and 122C from the example of FIG. 5. Reflective sub-element 122A, 122B, and 122C are shown as being angled with a same inclination, with respect to the second surface 110" of the light guide 110, so that reflective sub-elements 122A, 122B, and 122C direct light toward a same viewing angle of a multiview display. It will be understood that other reflective sub-elements can also have protrusion distances that vary in a manner as shown in FIGS. 6A-6C.

In some examples, a first reflective multibeam element 120A can include reflective sub-elements having a first protrusion distance. In these examples, a second reflective multibeam element 120B, spaced further along the propagation direction, can include reflective sub-elements having a second protrusion distance that is greater than the first protrusion distance.

FIG. 6A illustrates a cross-sectional view of the first reflective sub-element 122A in an example, according to an embodiment consistent with the principles described herein. The cross-section of the first reflective sub-element 122A, taken orthogonal to the guiding surface (such as the second surface 110") of the light guide 110 and parallel to the first propagation direction 103 (FIG. 5), can include a first segment 126A extending away from the guiding surface, a second segment 128A extending from the first segment 126A and substantially parallel to the guiding surface, and a third segment 130A extending from the second segment 128A to the guiding surface. The second segment 128A can be offset from the guiding surface by an offset value $H_A$. The offset value can increase in the first propagation direction along the length of the light guide. In some embodiments, the second segment 128A (e.g., a ledge, or substantially flat portion adjacent to the first segment 126A and substantially parallel to the second surface 110") can help improve recycling of the guided light in the light guide 110, by reducing an optical path that the guided light traverses before reflecting toward an opposing guiding surface.

FIG. 6B illustrates a cross-sectional view of the second reflective sub-element 122B in an example, according to an embodiment consistent with the principles described herein. The cross-section of the second reflective sub-element 122B, taken orthogonal to the guiding surface (such as the second surface 110") of the light guide 110 and parallel to the first propagation direction 103 (FIG. 5), can include a first segment 126B extending away from the guiding surface, a second segment 128B extending from the first segment 126B and substantially parallel to the guiding surface, and a third segment 130B extending from the second segment 128B to the guiding surface. The second segment 128B can be offset from the guiding surface by an offset value $H_B$. The offset value can increase in the first propagation direction along the length of the light guide. For example, because the second reflective sub-element 122B is advanced along the first propagation direction compared to the first reflective sub-element 122A, the offset value $H_B$ can be greater than the offset value $H_A$.

FIG. 6C illustrates a cross-sectional view of the third reflective sub-element 122C in an example, according to an embodiment consistent with the principles described herein. The cross-section of the third reflective sub-element 122C, taken orthogonal to the guiding surface (such as the second surface 110") of the light guide 110 and parallel to the first propagation direction 103 (FIG. 5), can include a first segment 126C extending away from the guiding surface, and a third segment 130C extending from the first segment 126C to the guiding surface. (Note that a second segment can be relatively short, or absent in this configuration.) The intersection of the first segment 126C and the third segment 130C can be offset from the guiding surface by an offset value $H_C$. The offset value can increase in the first propagation direction along the length of the light guide. For example, because the third reflective sub-element 122C is advanced along the first propagation direction compared to the second reflective sub-element 122B, the offset value $H_C$ can be greater than the offset value $H_B$.

Figures 6D, 6E, 6F:
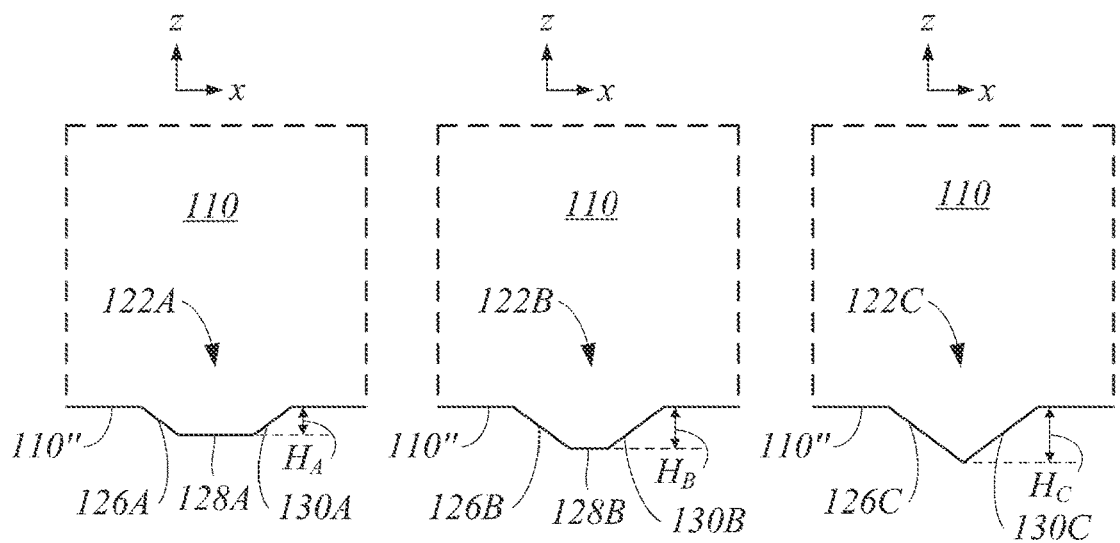
FIG. 6D illustrates a cross-sectional view of the first reflective sub-element in an example, according to an embodiment consistent with the principles described herein.
FIG. 6E illustrates a cross-sectional view of the second reflective sub-element in an example, according to an embodiment consistent with the principles described herein.
FIG. 6F illustrates a cross-sectional view of the third reflective sub-element in an example, according to an embodiment consistent with the principles described herein.

In FIGS. 6D-6F, the reflective sub-elements protrude from the second surface 110" of the light guide 110 and extend away from the interior of the light guide 110. The examples of FIGS. 6D-6F illustrate a second group of spaced multibeam elements corresponding respectively to 122A, 122B, and 122C from the example of FIG. 5.

FIG. 6D illustrates a cross-sectional view of the first reflective sub-element 122A in an example, according to an embodiment consistent with the principles described herein. The cross-section of the first reflective sub-element 122A, taken orthogonal to the guiding surface (such as the second surface 110") of the light guide 110 and parallel to the first propagation direction 103 (FIG. 5), can include a first segment 126A extending away from the guiding surface, a second segment 128A extending from the first segment 126A and substantially parallel to the guiding surface, and a third segment 130A extending from the second segment 128A to the guiding surface. The second segment 128A can be offset from the guiding surface by an offset value $H_A$. The offset value can increase in the first propagation direction along the length of the light guide.

FIG. 6E illustrates a cross-sectional view of the second reflective sub-element 122B in an example, according to an embodiment consistent with the principles described herein. The cross-section of the second reflective sub-element 122B, taken orthogonal to the guiding surface (such as the second surface 110") of the light guide 110 and parallel to the first propagation direction 103 (FIG. 5), can include a first segment 126B extending away from the guiding surface, a second segment 128B extending from the first segment 126B and substantially parallel to the guiding surface, and a third segment 130B extending from the second segment 128B to the guiding surface. The second segment 128B can be offset from the guiding surface by an offset value $H_B$. The offset value can increase in the first propagation direction along the length of the light guide. For example, because the second reflective sub-element 122B is advanced along the first propagation direction compared to the first reflective sub-element 122A, the offset value $H_B$ can be greater than the offset value $H_A$ (FIG. 6D).

FIG. 6F illustrates a cross-sectional view of the third reflective sub-element 122C in an example, according to an embodiment consistent with the principles described herein. The cross-section of the third reflective sub-element 122C, taken orthogonal to the guiding surface (such as the second surface 110") of the light guide 110 and parallel to the first propagation direction 103 (FIG. 5), can include a first segment 126C extending away from the guiding surface, and a third segment 130C extending from the first segment 126C to the guiding surface. (Note that a second segment can be relatively short, or absent in this configuration.) The intersection of the first segment 126C and the third segment 130C can be offset from the guiding surface by an offset value $H_C$. The offset value can increase in the first propagation direction along the length of the light guide. For example, because the third reflective sub-element 122C is advanced along the first propagation direction compared to the second reflective sub-element 122B, the offset value $H_C$ can be greater than the offset value $H_B$ (FIG. 6E).

FIGS. 6G-6L show examples of this variation in width along the length of the light guide 110. FIGS. 6G-6L all show cross-sectional views of examples of reflective sub-elements, with the cross-sections being taken orthogonal to a length of the light guide 110 (e.g., orthogonal to the first propagation direction 103 of FIG. 5).

Figures 6G, 6H, 6I:
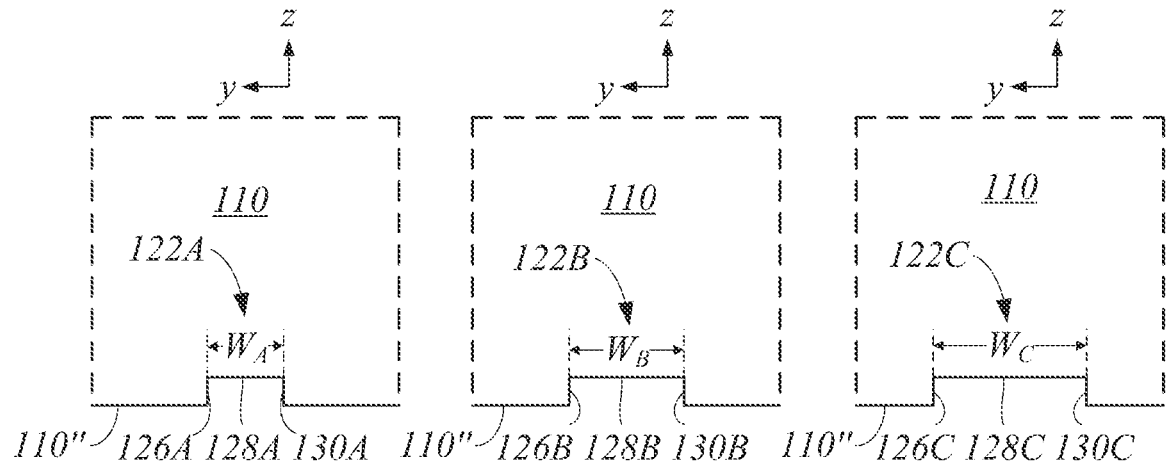
FIG. 6G illustrates a cross-sectional view of the first reflective sub-element in an example, according to an embodiment consistent with the principles described herein.
FIG. 6H illustrates a cross-sectional view of the second reflective sub-element in an example, according to an embodiment consistent with the principles described herein.
FIG. 6I illustrates a cross-sectional view of the third reflective sub-element in an example, according to an embodiment consistent with the principles described herein.

In FIGS. 6G-6I, the reflective sub-elements extend into the interior of the light guide 110. The examples of FIGS. 6G-6I illustrate a third group of spaced multibeam elements corresponding respectively to 122A, 122B, and 122C from the example of FIG. 5.

FIG. 6G illustrates a cross-sectional view of the first reflective sub-element 122A in an example, according to an embodiment consistent with the principles described herein. The cross-section of the first reflective sub-element 122A, taken orthogonal to the first propagation direction 103 (FIG. 5), can include a first segment 126A extending away from the guiding surface, a second segment 128A extending from the first segment 126A and substantially parallel to the guiding surface, and a third segment 130A extending from the second segment 128A to the guiding surface. The second segment 128A can have a width $W_A$. The width can increase in the first propagation direction along the length of the light guide.

FIG. 6H illustrates a cross-sectional view of the second reflective sub-element 122B in an example, according to an embodiment consistent with the principles described herein. The cross-section of the second reflective sub-element 122B, taken orthogonal to the first propagation direction 103 (FIG. 5), can include a first segment 126B extending away from the guiding surface, a second segment 128B extending from the first segment 126B and substantially parallel to the guiding surface, and a third segment 130B extending from the second segment 128B to the guiding surface. The second segment 128B can have a width $W_B$. The width can increase in the first propagation direction along the length of the light guide. For example, because the second reflective sub-element 122B is advanced along the first propagation direction compared to the first reflective sub-element 122A, the width $W_B$ can be greater than the width $W_A$.

FIG. 6I illustrates a cross-sectional view of the third reflective sub-element 122C in an example, according to an embodiment consistent with the principles described herein. The cross-section of the third reflective sub-element 122C, taken orthogonal to the first propagation direction 103 (FIG. 5), can include a first segment 126C extending away from the guiding surface, a second segment 128C extending from the first segment 126C and substantially parallel to the guiding surface, and a third segment 130C extending from the second segment 128C to the guiding surface. The second segment 128C can have a width $W_C$. The width can increase in the first propagation direction along the length of the light guide. For example, because the third reflective sub-element 122C is advanced along the first propagation direction compared to the second reflective sub-element 122B, the width $W_C$ can be greater than the width $W_B$.

Figures 6J, 6K, 6L:
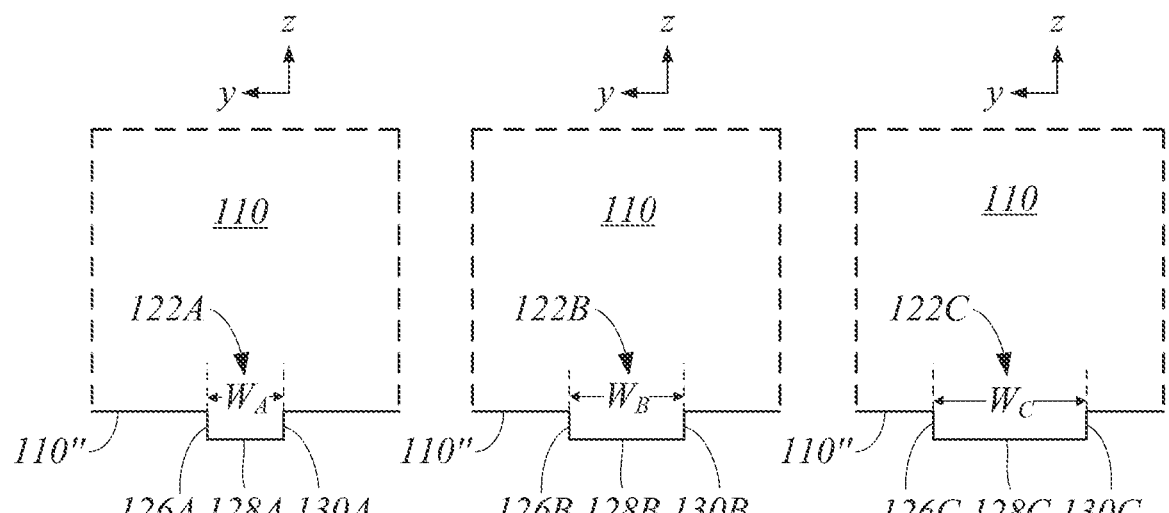
FIG. 6J illustrates a cross-sectional view of the first reflective sub-element in an example, according to an embodiment consistent with the principles described herein.
FIG. 6K illustrates a cross-sectional view of the second reflective sub-element in an example, according to an embodiment consistent with the principles described herein.
FIG. 6L illustrates a cross-sectional view of the third reflective sub-element in an example, according to an embodiment consistent with the principles described herein.

In FIGS. 6J-6L, the reflective sub-elements protrude from the second surface 110" of the light guide 110 and extend away from the interior of the light guide 110. The examples of FIGS. 6J-6L illustrate a fourth group of spaced multibeam elements corresponding respectively to 122A, 122B, and 122C from the example of FIG. 5.

FIG. 6J illustrates a cross-sectional view of the first reflective sub-element 122A in an example, according to an embodiment consistent with the principles described herein. The cross-section of the first reflective sub-element 122A, taken orthogonal to the first propagation direction 103 (FIG. 5), can include a first segment 126A extending away from the guiding surface, a second segment 128A extending from the first segment 126A and substantially parallel to the guiding surface, and a third segment 130A extending from the second segment 128A to the guiding surface. The second segment 128A can have a width $W_A$. The width can increase in the first propagation direction along the length of the light guide.

FIG. 6K illustrates a cross-sectional view of the second reflective sub-element 122B in an example, according to an embodiment consistent with the principles described herein. The cross-section of the second reflective sub-element 122B, taken orthogonal to the first propagation direction 103 (FIG. 5), can include a first segment 126B extending away from the guiding surface, a second segment 128B extending from the first segment 126B and substantially parallel to the guiding surface, and a third segment 130B extending from the second segment 128B to the guiding surface. The second segment 128B can have a width $W_B$. The width can increase in the first propagation direction along the length of the light guide. For example, because the second reflective sub-element 122B is advanced along the first propagation direction compared to the first reflective sub-element 122A, the width $W_B$ can be greater than the width $W_A$.

FIG. 6L illustrates a cross-sectional view of the third reflective sub-element 122C in an example, according to an embodiment consistent with the principles described herein. The cross-section of the third reflective sub-element 122C, taken orthogonal to the first propagation direction 103 (FIG. 5), can include a first segment 126C extending away from the guiding surface, a second segment 128C extending from the first segment 126C and substantially parallel to the guiding surface, and a third segment 130C extending from the second segment 128C to the guiding surface. The second segment 128C can have a width $W_C$. The width can increase in the first propagation direction along the length of the light guide. For example, because the third reflective sub-element 122C is advanced along the first propagation direction compared to the second reflective sub-element 122B, the width $W_C$ can be greater than the width $W_B$.

In the examples shown in FIGS. 6A-6F, the width is constant and the protrusion distance (or height) varies as a function of distance along the length of the light guide 110. In the examples shown in FIGS. 6G-6L, the protrusion distance (or height) is constant and the width varies as a function of distance along the length of the light guide 110. It will be understood that the width and the protrusion distance (or height) can optionally vary together, optionally in a manner in which a surface area (e.g., a product of width and height) of a reflective surface of the reflective sub-element 122 can increase with distance in the first propagation direction 103 along the length of the light guide 110.

In accordance with some embodiments of the principles described herein, a multiview display is provided. The multiview display is configured to emit modulated light beams as view pixels of the multiview display to provide a multiview image. The emitted, modulated light beams have different principal angular directions from one another. Further, the emitted, modulated light beams may be preferentially directed toward a plurality of viewing directions or views of the multiview display or equivalent of the multiview image. In non-limiting examples, the multiview image may include one-by-four (1×4), one-by-eight (1×8), two-by-two (2×2), four-by-eight (4×8) or eight-by-eight (8×8) views with a corresponding number of view directions. The multiview display including a plurality of views in a one direction but not in another (e.g., 1×4 and 1×8 views) may be referred to as a 'horizontal parallax only' multiview display in that these configurations may provide views representing different view or scene parallax in one direction (e.g., a horizontal direction as horizontal parallax), but not in an orthogonal direction (e.g., a vertical direction with no parallax). The multiview display that includes more than one scene in two orthogonal directions may be referred to a full-parallax multiview display in that view or scene parallax may vary on both orthogonal directions (e.g., both horizontal parallax and vertical parallax). In some embodiments, the multiview display is configured to provide a multiview display having three-dimensional (3D) content or information. The different views of the multiview display or multiview image may provide a 'glasses free' (e.g., autostereoscopic) representation of information in the multiview image being displayed by the multiview display, for example.

Figure 7:
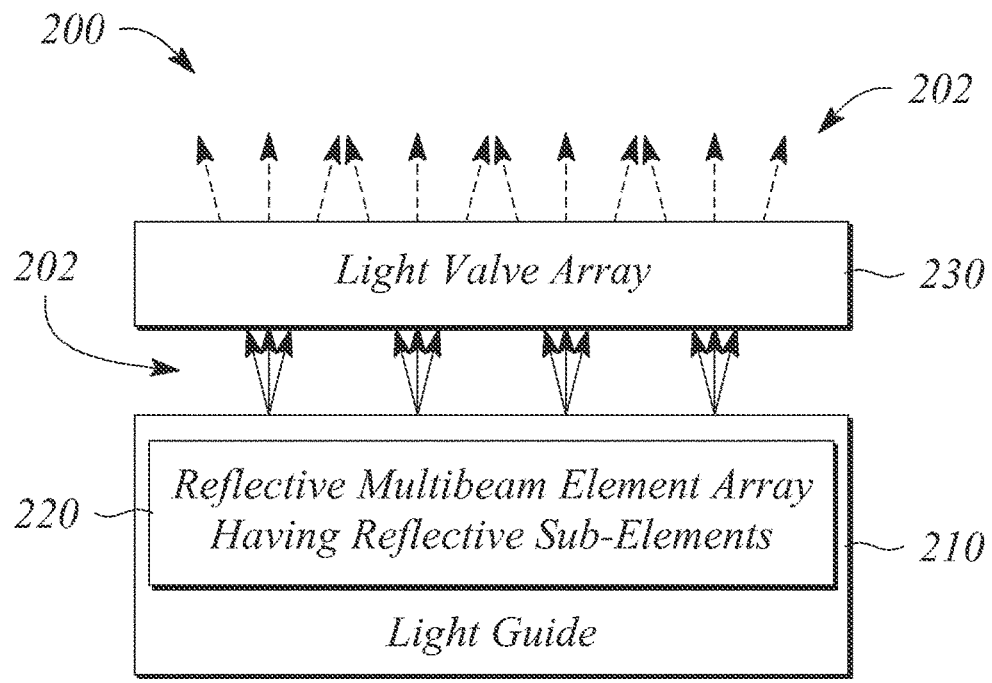
FIG. 7 illustrates a block diagram of a multiview display in an example, according to an embodiment consistent with the principles described herein.

FIG. 7 illustrates a block diagram of a multiview display 200 in an example, according to an embodiment consistent with the principles described herein. According to various embodiments, the multiview display 200 is configured to display a multiview image according to different views in different view directions. In particular, modulated directional light beams of the emitted light 202 emitted by the multiview display 200 may be used to display the multiview image and may correspond to pixels of the different views (i.e., view pixels). In FIG. 7, arrows having dashed lines are used to represent modulated directional light beams of the emitted light 202 to emphasize the modulation thereof, by way of example and not limitation.

As illustrated in FIG. 7, the multiview display 200 comprises a light guide 210. The light guide 210 is configured to guide light in a first propagation direction as guided light. The light may be guided, e.g., as a guided light beam, according to total internal reflection, in various embodiments. For example, the light guide 210 may be a plate light guide configured to guide light from a light-input edge thereof as a guided light beam. In some embodiments, the light guide 210 of the multiview display 200 may be substantially similar to the light guide 110 described above with respect to the multiview backlight 100.

The multiview display 200 illustrated in FIG. 7 further comprises an array of reflective multibeam elements 220. According to various embodiments, reflective multibeam elements 220 of the reflective multibeam element array are spaced apart from one another across the light guide 210. Reflective multibeam elements 220 of the reflective multibeam element array comprise a plurality of reflective sub-elements. In addition, the reflective multibeam elements 220 are configured to reflectively scatter out the guided light as emitted light 202 comprising directional light beams having directions corresponding to respective view directions of a multiview image displayed by the multiview display 200. The directional light beams of the emitted light 202 have different principal angular directions from one another. In particular, the different principal angular directions of the directional light beams correspond to different view directions of respective ones of the different views of the multiview image, according to various embodiments.

In some embodiments, each reflective sub-element can protrude from a guiding surface of the light guide by a respective protrusion distance. In some embodiments, at least some of the protrusion distances can vary as a function of distance along the length of the light guide. In some embodiments, the protrusion distances can vary as described above with respect to FIGS. 6A-6F.

As illustrated in FIG. 7, the multiview display 200 further comprises an array of light valves 230. The array of light valves 230 is configured to modulate the directional light beams of the emitted light 202 to provide the multiview image. In some embodiments, the array of light valves 230 may be substantially similar to the array of light valves 108, described above with respect to the multiview backlight 100.

In some embodiments, a size of the reflective multibeam elements is between about twenty-five percent (25%) and about two hundred percent (200%) of a size of a light valve 230 of the light valve array. In other embodiments, other relative sizes of the reflective multibeam elements 220 and light valves 230 may be employed, as described above with respect to the reflective multibeam elements 120 and light valves 108.

In some embodiments, the guided light may be collimated according to a predetermined collimation factor. In some embodiments, an emission pattern of the emitted light is a function of the predetermined collimation factor of the guided light. For example, predetermined collimation factor may be substantially similar to the predetermined collimation factor σ, described above with respect to the multiview backlight 100.

In some embodiments, a reflective sub-element of the reflective sub-element plurality of the reflective multibeam elements 220 is disposed on a guiding surface of the light guide 210. For example, the guiding surface may be a surface of the light guide 210 opposite to an emission surface of the light guide 210, as described above with respect to the multiview backlight 100. In some embodiments, the reflective sub-element may extend into an interior of the light guide. In other embodiments, the reflective sub-element may protrude from the guiding surface of the light guide 210.

In some embodiments, a reflective multibeam element 220 of the reflective multibeam element array further comprises a reflective material (such as, but not limited to, a reflective metal or a metal-polymer) adjacent to and coating reflective surfaces of the plurality of reflective sub-elements. In some embodiments, the reflective material is confined within a boundary of the reflective multibeam element 220, to form a reflective island that includes the reflective multibeam element 220 and the boundary-confined reflective material. The reflective material may be substantially similar to the reflective material 124 of reflective multibeam element 120, described above.

In some embodiments, each reflective multibeam element of the reflective multibeam element array can be configured to reflectively scatter respective emitted light that has a respective emitted light optical power level. In some embodiments, the protrusion distances can be selected such that the emitted light optical power levels are substantially equal for at least some of the reflective multibeam elements of the reflective multibeam element array. For example, the protrusion distances can increase with increasing distance away from a light source.

In some embodiments, each reflective multibeam element of the reflective multibeam element array can be configured to reflectively scatter respective emitted light that has a respective emitted light optical power level. In some embodiments, each reflective multibeam element of the reflective multibeam element array can have a respective width in a direction parallel to the guiding surface of the light guide. In some embodiments, the widths and the protrusion distances can be selected such that the emitted light optical power levels can be equal or substantially equal for at least some of the reflective multibeam elements of the reflective multibeam element array.

In some embodiments, light valves 230 of the light valve array are arranged in sets representing multiview pixels of the multiview display 200. In some embodiments, the light valves represent sub-pixels of the multiview pixels. In some embodiments, reflective multibeam elements 220 of the reflective multibeam element array have a one-to-one correspondence to the multiview pixels of the multiview display 200.

In some of these embodiments (not illustrated in FIG. 7), the multiview display 200 may further comprise a light source. The light source may be configured to provide the light to the light guide 210 with a non-zero propagation angle and, in some embodiments, is collimated according to a predetermined collimation factor to provide a predetermined angular spread of the guided light within the light guide 210. According to some embodiments, the light source may be substantially similar to the light source 130, described above with respect to the multiview backlight 100. In some embodiments, a plurality of light sources may be employed. For example, a pair of light sources may be used at two different edges or ends (e.g., opposite ends) of the light guide 210 to provide the light to the light guide 210 as guided light having two different propagation directions.

Figure 8:
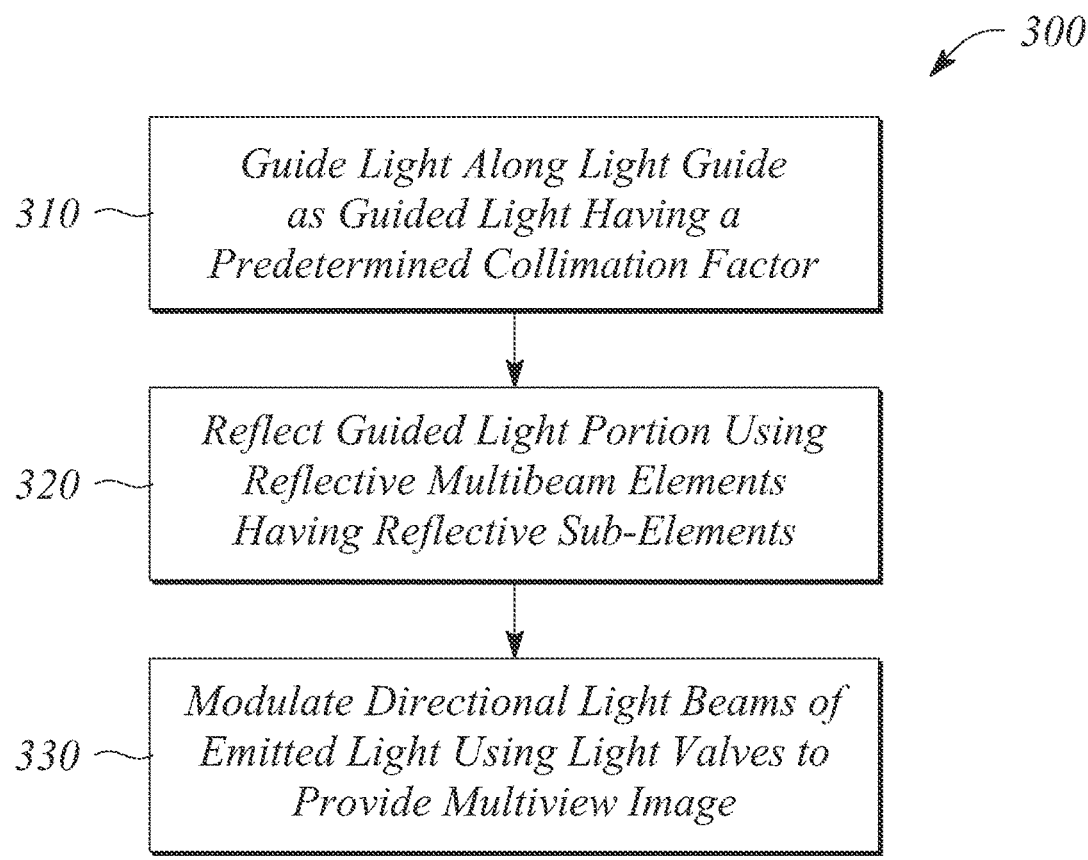
FIG. 8 illustrates a flow chart of a method of multiview backlight operation in an example, according to an embodiment consistent with the principles described herein.

In accordance with some embodiments of the principles described herein, a method of multiview backlight operation is provided. FIG. 8 illustrates a flow chart of a method 300 of multiview backlight operation in an example, according to an embodiment consistent with the principles described herein. As illustrated in FIG. 8, the method 300 of multiview backlight operation comprises guiding 310 light in a propagation direction along a length of a light guide as guided light. In some embodiments, the light may be guided 310 at a non-zero propagation angle. Further, the guided light may be collimated, e.g., collimated according to a predetermined collimation factor. According to some embodiments, the light guide may be substantially similar to the light guide 110 described above with respect to the multiview backlight 100. In particular, the light may be guided according to total internal reflection within the light guide, according to various embodiments.

As illustrated in FIG. 8, the method 300 of multiview backlight operation further comprises reflecting 320 a portion of the guided light out of the light guide using an array of reflective multibeam elements to provide emitted light comprising directional light beams having different directions corresponding to respective different view directions of a multiview display. In various embodiments, the different directions of the directional light beams correspond to respective view directions of a multiview display. In various embodiments, a reflective multibeam element of the reflective multibeam element array comprises a plurality of reflective sub-elements. In some embodiments, each reflective sub-element can protrude from a guiding surface of the light guide by a respective protrusion distance. In some embodiments, at least some of the protrusion distances can vary as a function of distance along the length of the light guide. In some embodiments, a size of each reflective multibeam element is between twenty-five percent and two hundred percent of a size of a light valve in an array of light valves of the multiview display.

In some embodiments, the reflective multibeam element is substantially similar to the reflective multibeam element 120 of the multiview backlight 100, described above. In particular, the plurality of reflective sub-elements of the reflective multibeam element may be substantially similar to the plurality of reflective sub-elements 122, described above.

In some embodiments, a reflective sub-element of the reflective sub-element plurality is disposed on a guiding surface of the light guide. In some embodiments, the reflective sub-element one of extends into an interior of the light guide and protrudes from the guiding surface of the light guide. According to various embodiments, an emission pattern of the emitted light may be a function of the predetermined collimation factor of the guided light.

In some embodiments, a reflective multibeam element of the reflective multibeam element array further comprises a reflective material adjacent to and coating reflective surfaces of the plurality of reflective sub-elements. In some embodiments, the reflective material is confined within a boundary of the reflective multibeam element. The reflective material may be substantially similar to the reflective material 124 of the above-described reflective multibeam element 120.

In some embodiments, each reflective multibeam element of the reflective multibeam element array can be configured to reflectively scatter respective emitted light that has a respective emitted light optical power level. In some embodiments, each reflective multibeam element of the reflective multibeam element array can have a respective width in a direction parallel to the guiding surface of the light guide. In some embodiments, the widths and the protrusion distances can be selected such that the emitted light optical power levels are equal or substantially equal for at least some of the reflective multibeam elements of the reflective multibeam element array.

In some embodiments (not illustrated), the method of multiview backlight operation further comprises providing light to the light guide using a light source. The provided light one or both of may have a non-zero propagation angle within the light guide and may be collimated within the light guide according to a collimation factor to provide a predetermined angular spread of the guided light within the light guide. In some embodiments, the light source may be substantially similar to the light source 130 of the multiview backlight 100, described above.

In some embodiments (e.g., as illustrated in FIG. 8), the method 300 of multiview backlight operation further comprises modulating 330 directional light beams of the emitted light reflectively scattered out by the reflective multibeam elements using light valves to provide a multiview image. According to some embodiments, a light valve of a plurality or an array of light valves corresponds to a sub-pixel of a multiview pixel and sets of light valves of the light valve array correspond to or are arranged as multiview pixels of a multiview display. That is, the light valve may have a size comparable to a size of the sub-pixel or a size comparable to a center-to-center spacing between the sub-pixels of the multiview pixel, for example. According to some embodiments, the plurality of light valves may be substantially similar to the array of light valves 108 described above of the multiview backlight 100, as described above. In particular, different sets of light valves may correspond to different multiview pixels in a manner similar to the correspondence of the first and second light valve sets 108*a*, 108*b* to different multiview pixels 106. Further, individual light valves of the light valve array may correspond to sub-pixels of the multiview pixels as the above-described light valve 108 corresponds to the sub-pixel in the above-reference discussion.

Thus, there have been described examples and embodiments of a multiview backlight, a method of multiview backlight operation, and a multiview display that employ reflective multibeam elements comprising reflective sub-elements to provide emitted light including directional light beams having directions corresponding to different directional views of a multiview image. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A multiview backlight comprising:
a light guide configured to guide light along a length of the light guide as guided light; and
an array of reflective multibeam elements spaced apart from one another across the light guide on a guiding surface of the light guide, each reflective multibeam element of the reflective multibeam element array comprising reflective sub-elements and being configured to reflectively scatter out a portion of the guided light as emitted light comprising directional light beams having directions corresponding to respective view directions of a multiview display,
each reflective sub-element protruding from the guiding surface of the light guide by a respective protrusion distance, at least some of the protrusion distances varying as a function of a distance along the length of the light guide,
a reflective sub-element of the reflective sub-elements protruding from the guiding surface of the light guide and away from an interior of the light guide and comprising a material of the light guide.

2. The multiview backlight of claim 1, wherein the protrusion distances increase in a first propagation direction along the length of the light guide.

3. The multiview backlight of claim 1, wherein:
each reflective multibeam element of the reflective multibeam element array is configured to reflectively scatter respective emitted light that has a respective emitted light optical power level; and
the protrusion distances are selected such that the emitted light optical power levels are substantially equal for at least some of the reflective multibeam elements of the reflective multibeam element array.

4. The multiview backlight of claim 1, wherein:
each reflective multibeam element of the reflective multibeam element array is configured to reflectively scatter respective emitted light that has a respective emitted light optical power level;
each reflective multibeam element of the reflective multibeam element array has a respective width in a direction parallel to the guiding surface of the light guide; and
the widths and the protrusion distances are selected such that the emitted light optical power levels are substantially equal for at least some of the reflective multibeam elements of the reflective multibeam element array.

5. The multi view backlight of claim 1, wherein a size of each reflective multibeam element is between twenty-five percent and two hundred percent of a size of a light valve in an array of light valves of the multiview display.

6. The multiview backlight of claim 1, wherein a reflective multibeam element of the reflective multibeam element array further comprises a reflective material adjacent to and coating reflective surfaces of the reflective sub-elements, an extent of the reflective material being confined to an extent of the reflective multibeam element to form a reflective island.

7. The multiview backlight of claim 1, wherein the light guide is further configured to guide the guided light in a first propagation direction along the length of the light guide and a second propagation direction opposite the first propagation direction, the reflective sub-elements being further configured to reflectively scatter out a portion of the guided light having the second propagation direction as a portion of the emitted light comprising the directional light beams having the directions corresponding to the respective view directions of the multiview display.

8. The multi view backlight of claim 7, wherein a cross-section of at least some of the reflective sub-elements, taken orthogonal to the guiding surface of the light guide and parallel to the first propagation direction, includes a first segment extending away from the guiding surface, a second segment extending from the first segment and substantially parallel to the guiding surface, and a third segment extending from the second segment to the guiding surface, the second segment being offset from the guiding surface by an offset value, the offset value increasing in the first propagation direction along the length of the light guide.

9. A multi view display comprising the multi view backlight of claim 1, the multiview display further comprising an array of light valves configured to modulate the directional light beams to provide a multiview image having directional views corresponding to the view directions of the multiview display.

10. A multiview display comprising:
a light guide configured to guide light along a length of the light guide as guided light;
an array of reflective multibeam elements spaced apart from one another across the light guide on a guiding surface of the light guide, each reflective multibeam element of the reflective multibeam element array comprising a plurality of reflective sub-elements and being configured to reflectively scatter out a portion of the guided light as emitted light comprising directional light beams having directions corresponding to respective view directions of a multi view image; and
an array of light valves configured to modulate the directional light beams to provide the multiview image,
each reflective sub-element protruding from the guiding surface of the light guide by a respective protrusion distance, at least some of the protrusion distances varying as a function of distance along the length of the light guide,
a reflective sub-element of the reflective sub-elements protruding from the guiding surface of the light guide and away from an interior of the light guide and comprising a material of the light guide.

11. The multiview display of claim 10, wherein one or both of a size of the reflective multibeam elements is between twenty-five percent and two hundred percent of a size of a light valve of the light valve array and the guided light is collimated according to a predetermined collimation factor, an emission pattern of the emitted light being a function of the predetermined collimation factor of the guided light.

12. The multiview display of claim 10, wherein a reflective multibeam element of the reflective multibeam element array further comprises a reflective material adjacent to and coating reflective surfaces of the plurality of reflective sub-elements, the reflective material being confined within a boundary of the reflective multibeam element.

13. The multiview display of claim 10, wherein:
each reflective multibeam element of the reflective multibeam element array is configured to reflectively scatter respective emitted light that has a respective emitted light optical power level; and
the protrusion distances are selected such that the emitted light optical power levels are substantially equal for at least some of the reflective multibeam elements of the reflective multibeam element array.

14. The multiview display of claim 10, wherein:
each reflective multibeam element of the reflective multibeam element array is configured to reflectively scatter respective emitted light that has a respective emitted light optical power level;
each reflective multibeam element of the reflective multibeam element array has a respective width in a direction parallel to the guiding surface of the light guide; and
the widths and the protrusion distances are selected such that the emitted light optical power levels are substantially equal for at least some of the reflective multibeam elements of the reflective multibeam element array.

15. The multi view display of claim 10, wherein:
the light valves of the light valve array are arranged in sets representing multiview pixels of the multiview display;
the light valves represent sub-pixels of the multiview pixels; and
the reflective multibeam elements of the reflective multibeam element array have a one-to-one correspondence to the multiview pixels of the multiview display.

16. A method of multiview backlight operation, the method comprising:
guiding light along a length of a light guide as guided light; and
reflecting a portion of the guided light out of the light guide using an array of reflective multibeam elements disposed on a guiding surface of the light guide to provide emitted light comprising directional light beams having different directions corresponding to respective different view directions of a multiview display,
a reflective multibeam element of the reflective multibeam element array comprising a plurality of reflective sub-elements,
each reflective sub-element protruding from the guiding surface of the light guide away from an interior of the light guide by a respective protrusion distance,
at least some of the protrusion distances varying as a function of distance along the length of the light guide,
each reflective sub-element comprising a material of the light guide.

17. The method of multiview backlight operation of claim 16, wherein:
the guided light is collimated according to a predetermined collimation factor; and
an emission pattern of the emitted light is a function of the predetermined collimation factor of the guided light.

* * * * *